(12) United States Patent
Shibata et al.

(10) Patent No.: US 8,607,157 B2
(45) Date of Patent: Dec. 10, 2013

(54) WORKSPACE MANAGEMENT METHOD, WORKSPACE MANAGEMENT SYSTEM, AND COMPUTER READABLE MEDIUM

(75) Inventors: Hirohito Shibata, Kanagawa (JP); Yoshifumi Matsunaga, Kanagawa (JP); Akinori Komura, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 898 days.

(21) Appl. No.: 12/265,533

(22) Filed: Nov. 5, 2008

(65) Prior Publication Data
US 2009/0064035 A1    Mar. 5, 2009

(30) Foreign Application Priority Data

Jun. 1, 2007   (JP) ................................ 2007-146482

(51) Int. Cl.
*G06F 3/048* (2013.01)

(52) U.S. Cl.
USPC .......................................... 715/803; 715/781

(58) Field of Classification Search
USPC ................................. 715/781, 803
See application file for complete search history.

(56) References Cited

U.S. PATENT DOCUMENTS

| | | | |
|---|---|---|---|
| 5,712,995 A * | 1/1998 | Cohn | 715/792 |
| 5,734,380 A * | 3/1998 | Adams et al. | 715/804 |
| 5,758,111 A * | 5/1998 | Shiratori et al. | 715/788 |
| 5,796,403 A | 8/1998 | Adams et al. | |
| 5,801,699 A | 9/1998 | Hocker et al. | |
| 5,808,610 A | 9/1998 | Benson et al. | |
| 5,819,055 A * | 10/1998 | MacLean et al. | 715/798 |
| 5,873,106 A * | 2/1999 | Joseph | 715/203 |
| 5,917,483 A * | 6/1999 | Duncan et al. | 715/802 |
| 5,977,973 A * | 11/1999 | Sobeski et al. | 715/798 |
| 6,008,809 A | 12/1999 | Brooks | |
| 6,550,057 B1 * | 4/2003 | Bowman-Amuah | 717/126 |

(Continued)

FOREIGN PATENT DOCUMENTS

| | | |
|---|---|---|
| JP | 64-076114 A | 3/1989 |
| JP | 02-028716 A | 1/1990 |

(Continued)

OTHER PUBLICATIONS

Australian Office Action dated Feb. 1, 2010 in Australian Application No. 2008243141.

(Continued)

*Primary Examiner* — Omar Abdul-Ali
*Assistant Examiner* — Anil Bhargava
(74) *Attorney, Agent, or Firm* — Sughrue Mion, PLLC

(57) ABSTRACT

A workspace management method for managing a plurality of windows displayed in response to start-up of an application as a workspace for user interface, the method including: managing management information regarding the windows; detecting a change in a state of each of the windows; detecting, in a case where a movement of one window of the windows is detected in the detecting of the change, the other windows positioned in the neighborhood of the one window or overlapping the one window by referring to the management information; displaying, in a case where the other windows are detected in the detecting of the other windows, a docking position to be docked in each of the one window and the other windows; and docking, in a case where a stop of the movement of the one window is detected in the detecting of the change, the one window with the other windows via the docking position.

30 Claims, 21 Drawing Sheets

BEFORE DOCKING

(56) References Cited

U.S. PATENT DOCUMENTS

| | | | |
|---|---|---|---|
| 6,590,594 B2 * | 7/2003 | Bates et al. | 715/784 |
| 6,771,292 B2 * | 8/2004 | Sharp | 715/788 |
| 7,289,964 B1 * | 10/2007 | Bowman-Amuah | 705/1.1 |
| 7,434,177 B1 * | 10/2008 | Ording et al. | 715/862 |
| 7,543,244 B2 * | 6/2009 | Matthews et al. | 715/811 |
| 7,839,419 B2 * | 11/2010 | Hanggie et al. | 345/619 |
| 2002/0122066 A1 | 9/2002 | Bates et al. | |
| 2003/0107604 A1 * | 6/2003 | Ording | 345/788 |
| 2003/0152270 A1 | 8/2003 | Saiga et al. | |
| 2005/0088452 A1 * | 4/2005 | Hanggie et al. | 345/581 |
| 2005/0125742 A1 * | 6/2005 | Grotjohn et al. | 715/799 |
| 2006/0218499 A1 * | 9/2006 | Matthews et al. | 715/765 |
| 2007/0180448 A1 * | 8/2007 | Low et al. | 718/1 |
| 2008/0034317 A1 * | 2/2008 | Fard et al. | 715/781 |

FOREIGN PATENT DOCUMENTS

| | | |
|---|---|---|
| JP | 9-212330 A | 8/1997 |
| JP | 2715421 B2 | 11/1997 |
| JP | 11-110099 A | 4/1999 |
| JP | 2000-298542 A | 10/2000 |
| JP | 2001-501006 A | 1/2001 |
| JP | 2001-268371 A | 9/2001 |
| JP | 2002-215683 A | 8/2002 |
| JP | 2003-241359 A | 8/2003 |
| JP | 2005-084699 A | 3/2005 |

OTHER PUBLICATIONS

Notification of Reason for Refusal issued on Jun. 29, 2011 in counterpart Japanese Application No. 2007-146482.
Notice of Preliminary Rejection dated Dec. 23, 2011, issued by the Korean Intellectual Property Office in counterpart Korean Application No. 10-2008-0115468.
Card et al, "A Multiple, Virtual-Workspace Interface to Support User Task Switching," Proceedings of CHI, pp. 53-59 (1987).
Robertson et al, "The Task Gallery: A 3D Window Manager," Proceedings of CHI, pp. 494-501 (2000).
Robertson et al, "Scalable Fabric: Flexible Task Management," Proceedings of AVI, pp. 85-89 (2004).
Smith et al, "GroupBar: The TaskBar Evolved," Proceedings of OZCHI, pp. 1-10 (2003).
Czerwinski et al, "A Diary Study of Task Switching and Interruptions," Proceedings of CHI, pp. 1-8 (2004).
Kandogan et al, "Elastic Windows: Improved Spatial Layout and Rapid Multiple Window Operations," Proceedings of ACM Advanced Visual Interfaces (AVI), Gubbio, Italy, pp. 29-38 (1996).
Kandogan et al, "Elastic Windows: Evaluation of Multi-Window Operations," Proceedings of CHI, pp. 250-257(1997).

* cited by examiner

BEFORE DOCKING

AFTER DOCKING

ENLARGED

HEIGHT OF A IS CHANGED, BUT WIDTH OF A IS NOT CHANGED

ENLARGING A

WIDTH OF A IS INCREASED    B AND C ARE REDUCED WITH RATIO OF WIDTHS KEPT

ENLARGING A

BREADTH OF A AND B IS ENLARGED

BREADTH OF B AND C IS REDUCED

BEFORE DOCKING

DRAGGING

DROPPING C

AFTER DOCKING

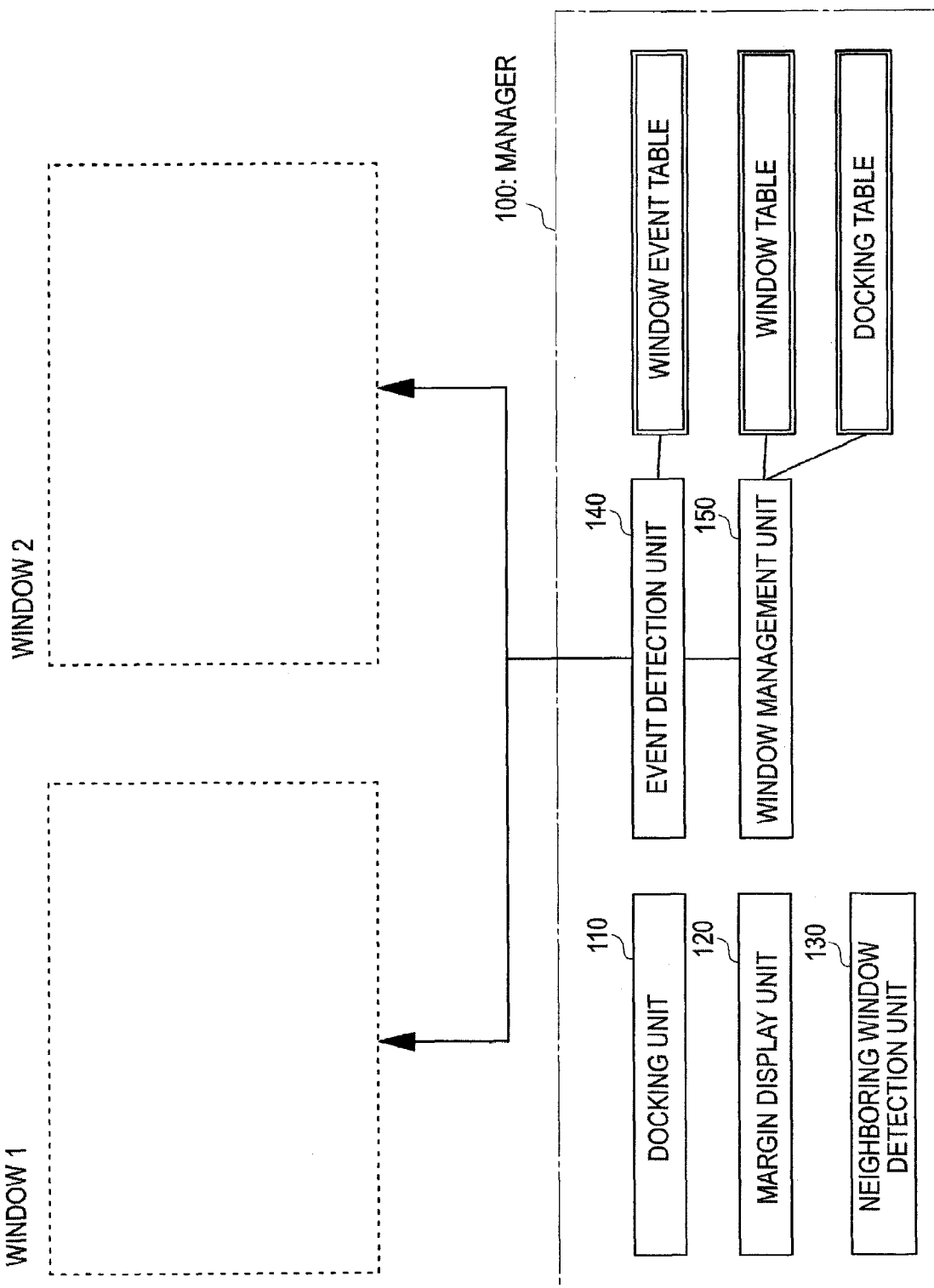

BEFORE DOCKING

DROPPING W

AFTER DOCKING

NUMBER OF TIMES THAT WINDOW Wi IS USED IN TIME INTERVAL Tj

ASSUMING THE ROW VECTORS CORRESPONDING TO Wx AND Wy AS
Vx = (Vx1, ⋯ , Vxm)
Vy = (Vy1, ⋯ , Vym)
THE DEGREE OF SIMILARITY BETWEEN THE WINDOWS Wx AND Wy IS $$\frac{(VX, VY)}{\|VX\|*\|VY\|}$$

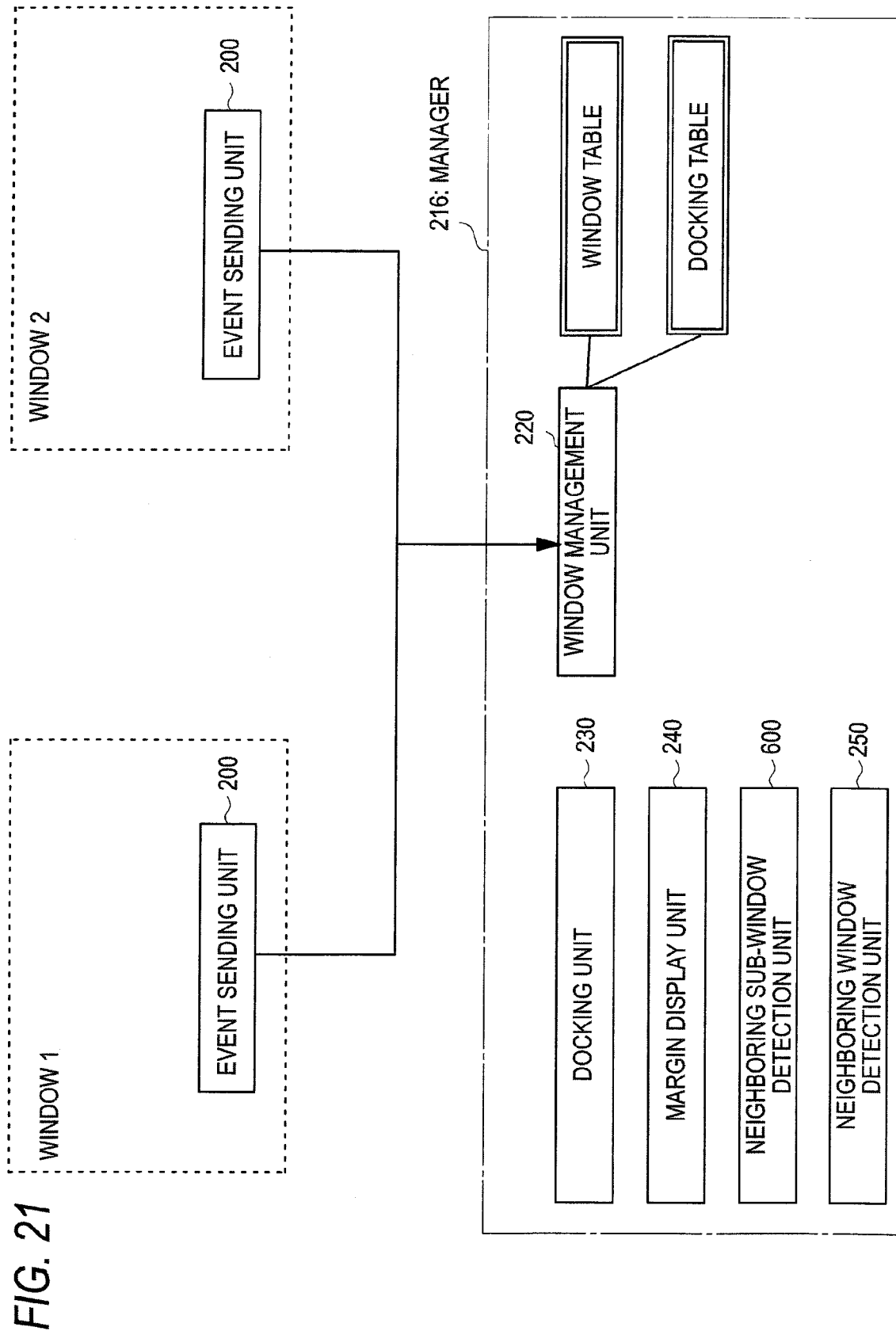

*FIG. 22A*
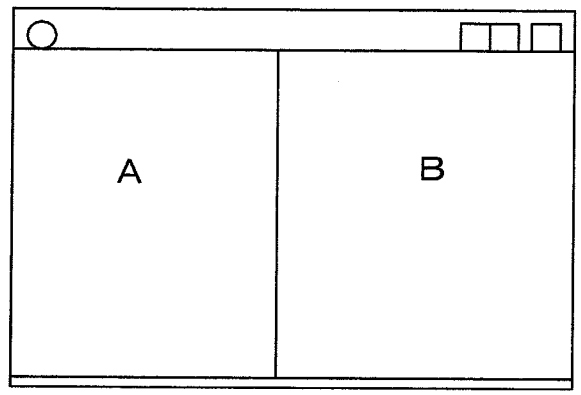
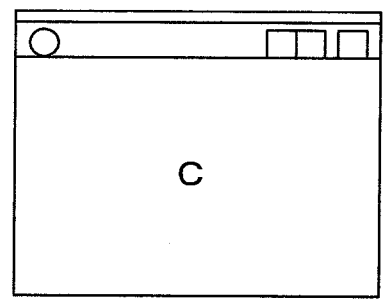
"MARGIN" OF EXTENDED DOCKING
*FIG. 22B*
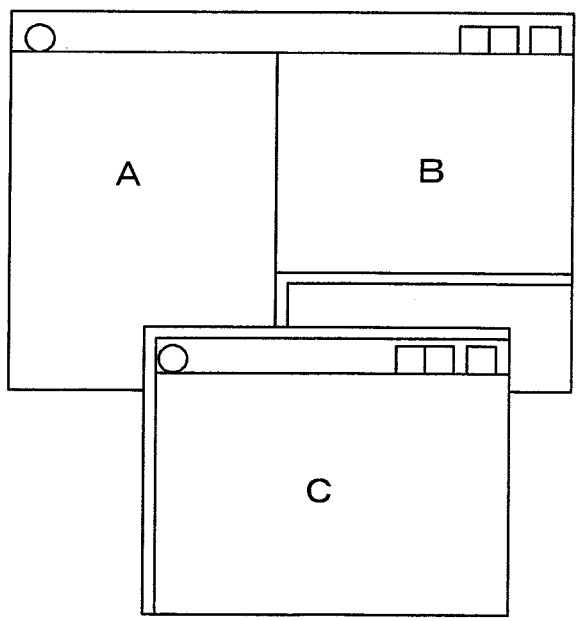
"MARGIN" OF EMBEDDED DOCKING

DOCKING TO RIGHT OF B

DOCKING TO BOTTOM OF B

DOCKING TO LEFT OF B

WORKSPACE MANAGEMENT METHOD, WORKSPACE MANAGEMENT SYSTEM, AND COMPUTER READABLE MEDIUM

BACKGROUND

1. Technical Field

The present invention relates to a workspace management method, a workspace management system, a computer readable medium storing a program for managing a window displayed in response to start-up of an application as a workspace for user interface.

2. Related Art

In recent years, information is more diversified, and the amount of information is enormous. An individual personal computer (PC) is not exceptional. The user performs a work on the PC by starting various applications and opening various documents at the same time. When various kinds of information is displayed or edited, various applications are employed. The operational scheme is different depending on the purpose or the kind of information. For example, a word processor is used for a text sentence, a draw tool is used in drawing a picture, and a Web browser is used to see a document on the Web.

In such a situation, various applications are started on the PC, and many documents are opened, for which the management is troublesome. In the Windows (registered trademark) that is a universal OS (Operating System), the active application and the opened document are iconized on a bar called a task bar, allowing the user to survey the currently active application and opened document (i.e., window). However, if the number of windows is increased, many icons are arranged, whereby it is troublesome to look for a desired icon on the task bar. To cope with this problem, a plurality of documents opened in the same application (e.g., Microsoft Word or Internet Explorer) are iconized as a unit on the task bar in the Windows.

However, there is one problem. An action (task) for the user to attain a certain purpose does not necessarily correspond to an application. That is, one task is not always completed in one application. Rather, two or more applications are often involved to accomplish one task. For example, in writing a technical article, the user displays a dictionary, an article read by himself or herself, his or her own article written before, and a draw tool for drawing the diagram at the same time (by activating the corresponding applications at the same time) in addition to a word processor. Also, in making the programming, an editor for editing the source code, the environment for compiling or debugging, a manual, and a Web browser (for retrieval as needed) are employed at the same time. In creating a mail, a mailer, a calendar, a schedule management system, and a name list management system are employed at the same time. Further, in these tasks, individual applications or documents are arranged on the desk top to the user's liking to constitute a working space for the user. Such working space corresponding to the task of the user is called a "workspace" in this specification.

Usually, the user mostly performs various tasks in parallel. After reading or writing a mail, the user reads others' articles, and further writes his or her own thesis. At this time, a work of switching the tasks is often troublesome. There occurs a problem that it is required to click the icon many times to make plural applications or documents active, or it is not possible to place the same document at a different position in a different workspace. What the user wants to do is to switch the tasks, or workspaces, and manage them. The switching or management of the applications only imposes the system's convenience on the user. Various applications or documents are arranged flexibly to the user's liking to make the configuration of the workspace more easy, whereby it is required that the switching of the workspaces occurring in switching the tasks can be made simply.

SUMMARY

According to an aspect of the present invention, a workspace management method for managing a plurality of windows displayed in response to start-up of an application as a workspace for user interface, the method including: managing management information regarding the windows; detecting a change in a state of each of the windows; detecting, in a case where a movement of one window of the windows is detected in the detecting of the change, the other windows positioned in the neighborhood of the one window or overlapping the one window by referring to the management information; displaying, in a case where the other windows are detected in the detecting of the other windows, a docking position to be docked in each of the one window and the other windows; and docking, in a case where a stop of the movement of the one window is detected in the detecting of the change, the one window with the other windows via the docking position.

BRIEF DESCRIPTION OF THE DRAWINGS

Exemplary embodiment of the present invention will be described in detail based on the following figures, wherein:

FIG. 1B shows a state where the window B is docked with the window A;

FIGS. 2A and 2B are views for explaining the changing of the size of a sub-window in the docking window, in which FIG. 2A shows the changing of the size of the sub-window B, and FIG. 2B shows the changing of the size of the sub-window A;

FIGS. 3A and 3B are views for explaining a state where the size of sub-window is changed in the window into which the windows A, B and C are docked, in which FIG. 3A shows the changing of the size of the sub-window A, and FIG. 3B shows the changing of the size of the sub-windows B and C;

FIGS. 4A and 4B are views for explaining a state where the size of sub-window is changed in the window into which the windows A, B, C and D are docked, in which FIG. 4A shows the changing of the size of the sub-window A, and FIG. 4B shows the changing of the size of the sub-windows B, C and D;

FIGS. 5A and 5B are views for explaining the embedded docking, in which FIG. 5A shows a state before the window C is docked with the docking window A and B, and FIG. 5B shows a state after the window C is docked;

FIG. 6 is a block diagram showing the configuration of an event detection method in a workspace management system according to an embodiment of the invention;

FIGS. 13A and 13B are operation explanatory views, in which FIG. 13A is an operation explanatory view for margin display unit, and FIG. 13B is an operation explanatory view for docking unit;

FIG. 21 is a block diagram showing a system configuration for making the embedded docking according to this embodiment;

FIGS. 22A and 22B are views for explaining examples of docking, in which FIG. 22A shows an example of extended docking, and FIG. 22B shows an example of embedded docking;

DETAILED DESCRIPTION

A basic idea of a workspace management system according to the present invention will be described below with reference to the drawings. The idea of the invention is largely divided into two parts.

Figure 1A:
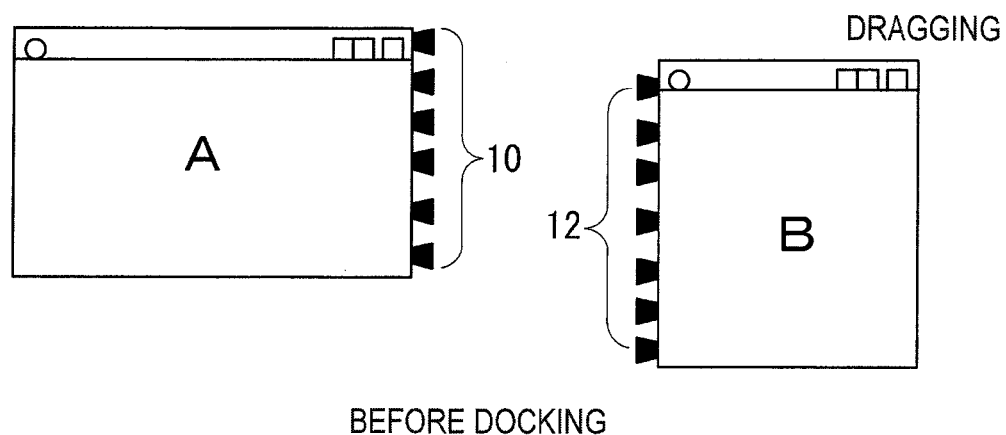
FIGS. 1A and 1B are views for explaining a state of window, in which 1A shows a state where a window B is dragged near a window A.
Figure 1B:
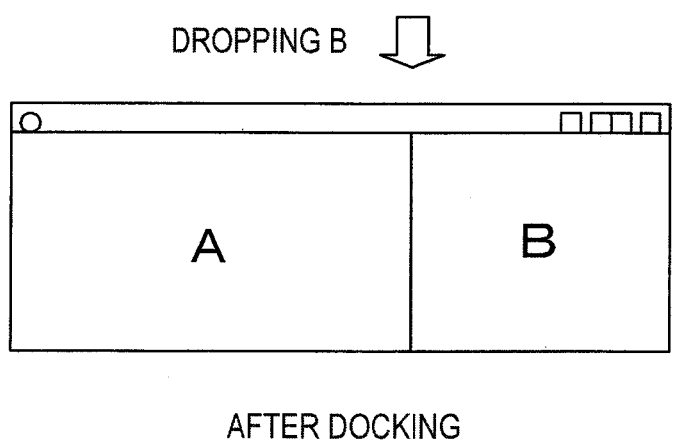

1. A user interface for supporting the construction and switching of the workspace 2. An architecture for realizing the user interface of 1 to incorporate the existent application into a framework of the invention as simply as possible 1. User Interface and its Operation FIG. 1A shows a state where two windows A and B are displayed on a display and the window B is dragged near the window A. The windows A and B are displayed on the display by executing different application software on the operating software of a computer, in which the window B is selected by an input device such as a mouse, and dragged (moved). If the window A and the window B are closer to some extent, the serrated margins 10 and 12 indicating that both windows can be docked are displayed on the opposed sides of the windows A and B. If the window B is dropped (stopped to move) in this state, both the windows A and B are docked into one window, as shown in FIG. 1B. At this time, the size of the window B is adjusted in the size adapted to the size of the side on which the margin of the window A is displayed.

Herein, the docked window (hereinafter referred to as a docking window) behaves like the normal window that is not docked (hereinafter referred to as a non-docking window).

(a) The shape of window after docking is rectangular or square.

(b) The windows after docking are moved together. Namely, both the windows A and B are moved at the same time by dragging a title bar.

(c) The individual sub-windows contained in the docking window can be closed, maximized or minimized at the same time.

Also, the docking window, which is an aggregate of multiple windows, is different from the normal window in the following points.

(a) The size of the other sub-window (further, the docking window that puts together the entirety) is also changed by changing the size of a specific sub-window.

(b) The docking can be canceled. The entirety may be canceled or the specific sub-window only may be canceled.

(c) The display of the title bar may be different from the display of the normal window to indicate the docking, as needed.

(c1) A "docking cancel" button is added to the normal buttons of "minimization", "maximization" and "closing".

(c2) The icon of window is changed to the special icon.

(c3) The background color of the title bar is changed.

Figure 2A:
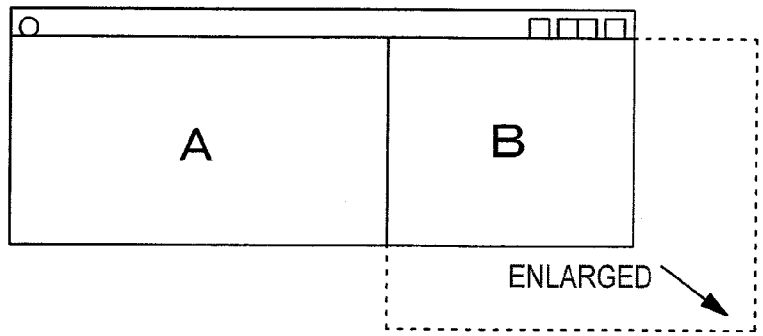
Figure 2B:
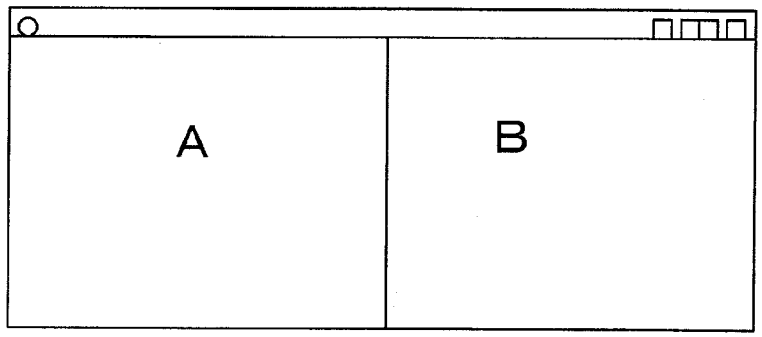

Next, the operation in changing the size of sub-window will be described below. FIG. 2 shows the changing of the size of the sub-window B to change the size of the window A and change the total size of the docking window (including the windows A and B) at the same time. If the window B is enlarged (increased in height and width) as shown in FIG. 2A, the height of the window A is changed as shown in FIG. 2B. However, the width of the window A is not changed.

Figure 3A:
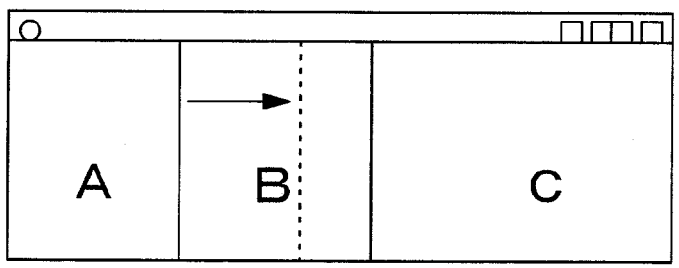
Figure 3B:
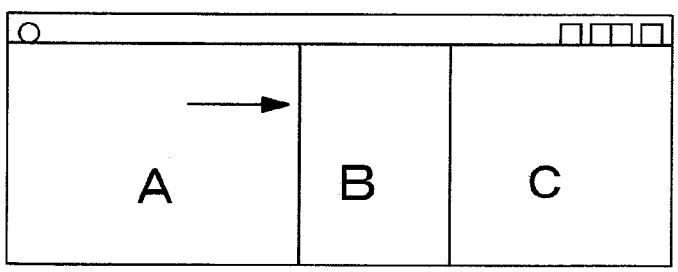

FIG. 3 shows how the window A is widened in the window into which the sub-windows A, B and C are docked. If the width of the sub-window A is increased from the state as shown in FIG. 3A, the windows B and C are reduced at the same ratio of widths as shown in FIG. 3B.

Figure 4A:
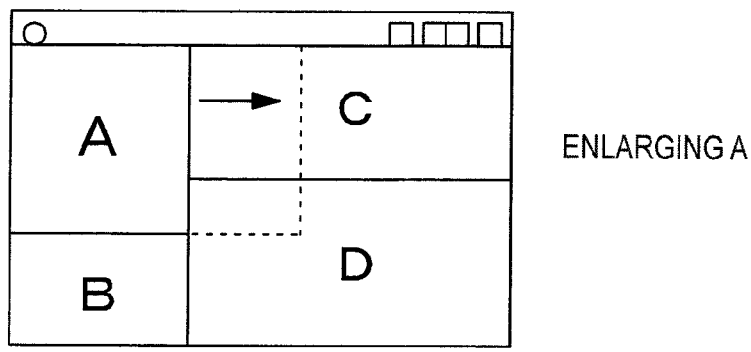
Figure 4B:
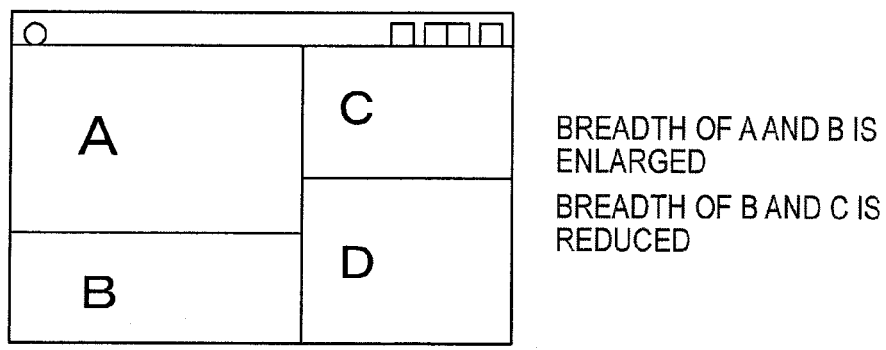

FIG. 4 shows how the window A is widened in the window into which the sub-windows A, B, C and D are docked. If the sub-window A is enlarged from the state as shown in FIG. 4A, the width of the windows C and D is reduced accordingly as shown in FIG. 4B. At the same time, the width of the window B is enlarged.

In the invention, it is supposed that the docking window is employed as a workspace. In this meaning, the docking window and the workspace are synonymously used.

2. Architecture (Realization Method)

To realize a framework (hereinafter referred to as a Docking Window Framework (DWF)) for the above idea of the invention, it is advantageous if the DWF can be realized simply by adding a function to an operating system (OS) from the following viewpoints.

(a) The advantage of the DWF can be obtained without changing the existent application (e.g., application of Microsoft Office).

(b) Even if there is a bug in the system, it is sufficient to replace only a module added to the OS, and it is unnecessary to replace each application. This can be also true for the version-up of the system.

However, such a thing is generally difficult. Because it is difficult to know what event occurs in the window of the application and what state the window is in from outside of the application. Herein, two methods are proposed to cope with this problem. Herein, a module for managing the window added to the OS is called a "manager".

Method A (event detection method): The event detection method involves periodically checking the states of all the windows with the manager and specifying the kind of event from the kind of change if there is a change in the window state.

Method B (event notification method): The event notification method involves notifying that an event occurs from the window to the manager if each window has a change in the window state.

The event detection method allows the realization of the DWF without changing the application at all. However, it has the following problems.

(a) Since the manager periodically checks the states of all the windows, a large amount of computer resources are employed.

(b) Since an event is detected by the periodical check, there is a time lag from the actual occurrence of the event to the detection of the event. This causes a delay in the overall behavior of the DWF. Of course, though this problem is relieved by using a smaller check period, the more computer resources are consumed if the period is smaller.

For the event notification method, it is required for the application side to perform a process of "notifying the manager that there is an event at necessary timing". That is, it is required to change each application. Of course, the less change, the better. Since it is troublesome to change all the applications at every time of changing the function in the manager, it is desirable that the functions to be mounted on each application are universal (sturdy for changing the functions). Thus, as the minimum function provided on the application side, it is proposed that "a specific event is notified to the manager if it occurs." To be important here is that the application side only informs the occurrence of event to the manager, but does not perform any other things (including bidirectional communication with the manager), in which if the application only makes the notification, the manager deals with all other things. The kinds of event to be sent are as follows as the minimum configuration, as described in detail in the embodiments.

Start of application "Execute"
End of application "Exit"
Active window "Active"
Moving window "Move"
Dropping window (end of movement) "Drop"
Size change of window "Resize"

Actually, Exit corresponding to Execute is added to the list, but Exit is not absolutely necessary. If there is Exit, the operation is smarter, but Exit is not requisite. More specifically, if Exit is not detected, the window can not be deleted from the table in closing the window, so that the window becomes larger. This increases the process. Also, to cope with "maximization", "minimization" and "restoration" of the window, there is possibility that a Resize event is subdivided. For reference, there is possibility that some of these events are automatically detected by the manager, and the others are notified from the application.

(Kinds of Docking)

Figure 5A:
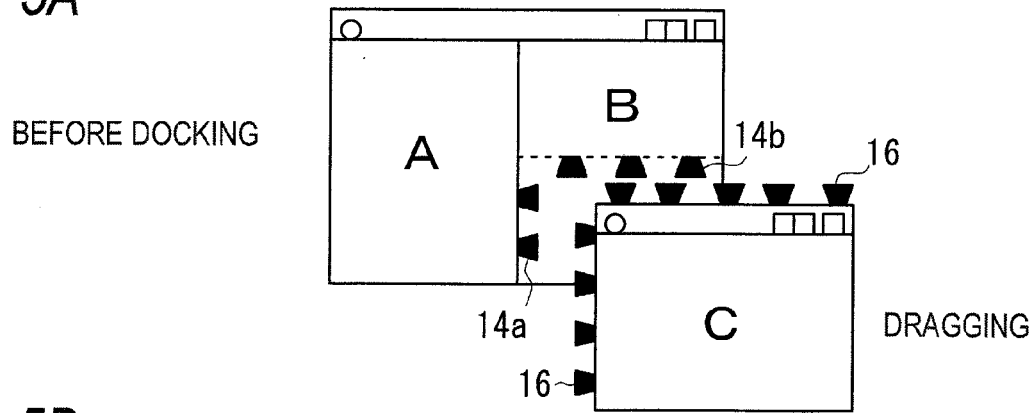
Figure 5B:
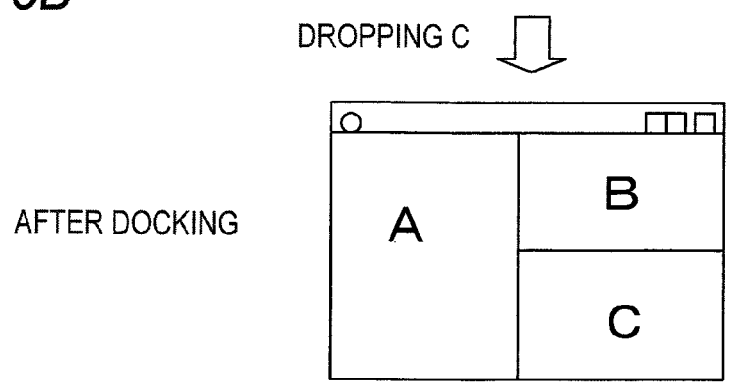

The docking as shown in FIG. 1 is performed in the form in which the window B sticks to the outside of the window A to be docked (B jutting out of A). Such docking is called the "extended docking". On the contrary, the docking as shown in FIGS. 5A and 5B is performed in the form in which the window C intrudes into an area of the window B in the docking window of the windows A and B. The docking in the form in which the window intrudes into the existent window is called the "embedded docking".

A difference between the extended docking and the embedded docking will be additionally described below. First, in the extended docking the size of window is changed before and after docking, whereas in the embedded docking the size of window is not changed before and after docking. Second, in the extended docking the "margin" is displayed on only one side for each window, whereas in the embedded docking the "margin" is displayed on two or more sides for each window. As shown in FIG. 5A, the margins 14a and 14b are displayed on each side of the windows A and B that are docked, and the margin 16 is displayed on the left end and upper end of the window C.

The maximum feature of the invention is the ability of configuring the workspace through the operation of docking for the singly usable application. The arrangement of windows is not preserved as conventionally, but the arranging operation itself leads to configuring the workspace. That is, the creation of the workspace is intuitive, and the feedback of the result can be obtained at once. A feature in the realization is the ability of managing the workspace by making no or little change for the existent application.

Further, the workspace management system of the invention can be applied in the following way.

(Interaction with Docking Window)

(a) The specific window in the workspace is increased or decreased. Relatively, the other window is decreased or increased. This corresponds to the enlargement or reduction, not the maximization or minimization.

(b) The specific window in the workspace is shrunken. Relatively, the other window is increased.

(c) The state of the docking window (positional relationship of the sub-window with the application) can be saved and regenerated.

(d) The state of document in the docking window (in addition to the window state, the document opened in each window, scroll position and cursor position) can be saved and regenerated.

(The System Automatically Searching for the Window Configuring the Workspace and Presenting the Candidate)

When the user firstly uses a framework using the invention, it can be used as a support for constructing the workspace, or when the windows are docked in normal use, another window that can become the candidate may be automatically recommended. The application or document of docking candidate may be collected in the following way.

(a) The date and time attributes (creation, update, reference) of the document are closer.

(b) The document that has been used together before (c) The document that is used together in another workspace (The System Presenting the Optimal Arrangement Method for the Window Arrangement in the Workspace)

(a) Analyzing how the active sub-window transits in the behavior of the user in the workspace and recommending the appropriate window arrangement (a1) The movement of operation or movement of eye-line is desirably smaller (a2) The operation is desirably shifted from left to right or top to bottom (a3) The sub-windows frequently switched in the operation are desirably adjacent

EMBODIMENTS

A workspace system according to an embodiment of the invention will be described below. The workspace system according to the embodiment can be performed by the application software executable on an OS mounted on a personal computer, or a program incorporated into the OS, for example.

In the following explanation, to begin with, two event processing methods, 1. event detection and 2. event notification, will be described below. As its expansion, 3. an exemplary system for saving and regenerating the window state and document state is given. Further, 4. an exemplary system for automatically presenting the window candidate to be docked and 5. an exemplary system for presenting the optimal window arrangement in the workspace are given. Finally, 6. an example of embedded docking is given. In these examples, the extended docking is presupposed as the docking method. The embedded docking will be described lastly. It is noted that the extended docking is simply referred to as the docking.

1. Event Detection Method

In the event detection method, it is unnecessary to change the window for individual applications, and the manager performs all the operations. Also, in the event detection, an Exit event is not detected.

FIG. 6 is a block diagram showing the configuration of the event detection method. The manager 100 for performing the event detection method comprises docking unit 110 for docking the windows, margin display unit 120 for displaying the margin on the window to be docked, neighboring window detection unit 130 for detecting the neighboring window of docking object, event detection unit 140 and window management unit 150, as shown in FIG. 6.

(Event Detection Unit)

First of all, the event detection unit 140 will be described below. The event detection unit 140 detects the event by periodically acquiring the active window state, and comparing it with the previous window state while referring to a window event table.

Table 1 shows a data structure of the window event table. The window event table has the following columns.

"Window ID" holds an identifier of window.
"Position" holds the upper left coordinate of window.
"Size" holds the width and height of window.
"Active" holds a flag indicating whether the window is currently active or not.
"Event" holds the event occurring immediately before for the active window.

TABLE 1

| Window ID | Position | Size | Active | Event |
|---|---|---|---|---|
| W001 | (10,10) | 120 × 200 | | |
| W002 | (220,40) | 300 × 200 | 1 | Move |
| W003 | (300,50) | 200 × 200 | | |

Figure 7:
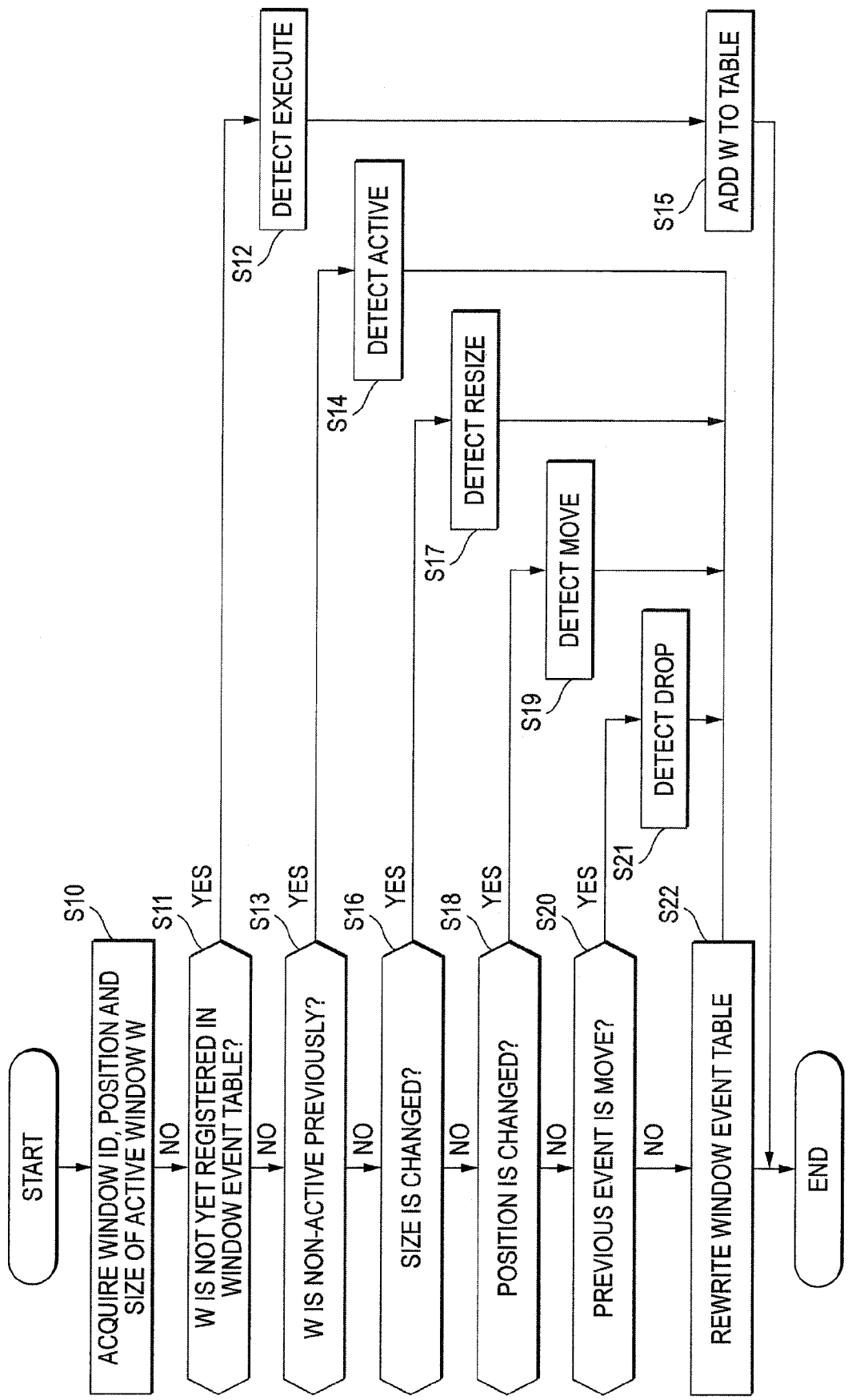
FIG. 7 is a flowchart showing the operation flow of event detection unit according to this embodiment.

FIG. 7 shows an operation flow of the event detection unit. As shown in FIG. 7, the event detection unit 140 periodically acquires the window ID (id), position (Position) and size (Size) of the active window W (step S10). And it is checked whether or not the active window W is already registered in the window event table (step S11).

If the active window W is not registered in the table, it is known that the window becomes active for the first time, in which the event is "Execute". The event "Execute" is detected (step S12), and added as an item of the active window W to a window event table, whereby the process is ended.

If the active window W already exists in the table, whether or not the window W is active is acquired from the table (step S13). If the window W in the table is not active, it becomes active by the check at this time, whereby an event "Active" is detected (step S14). And the table is rewritten (step S15), whereby the process is ended.

If the window W in the table is already active, it is known that the window W is active at least before this time. Then, the previous size "size_old" is acquired from the table, and compared with the current size "size" of the active window W to check whether or not the size is changed (step S16). If the "size" and the "size_old" are different, it is known that the size of the active window W is changed, whereby an event "Resize" is detected (step S17). And the table is rewritten, whereby the process is ended.

If the "size" and the "size_old" are the same value, it is known that the size is not changed. At this time, the previous position "position_old" is acquired from the table, and compared with the current position "position" of the active window W to check whether or not the position is changed (step S18).

If the "position" and the "position_old" are different, it is known that the window position is changed, whereby an event "Move" is detected (step S19). If the "position" and the "position_old" are the same, it is known that there is no movement. In this case, the previous event is acquired from the table, and it is checked whether or not the previous event is "Move" (step S20). In the case of "Move", since it is known that the Move is ended by the check at this time, an event "Drop" is detected (step S21).

If the event is detected in the above manner, it is required that the window event table is rewritten, whether the event is detected or not (step S22). Firstly, the "active" column and the "event" column in the table are all cleared. Then, the line of W in the "active" column is checked. Further, if the event is detected, the detected event is written in the "event" column of W.

(Window Management Unit)

The "window management unit" receives an event message from event sending unit of individual windows, and performs an operation on the necessary window by referring to the "window table" and "docking table". First of all, the data structure of the window table and docking table and then the behavior of the window management unit will be described below.

The "window table" manages all the windows during execution. Table 2 shows the data structure. The window table has the following columns.

"Window ID" holds the ID of window.
"Position" holds the upper left coordinate of each window.
"Size" holds the width and height of each window.
"Docking ID" holds a set of window IDs for the windows that are docked if the windows are docked. If the window is not docked with any window, this column is empty.

TABLE 2

| Window ID | Position | Size | Docking ID |
|---|---|---|---|
| W001 | (10,10) | 120 × 200 | |
| W002 | (220,40) | 300 × 200 | |
| W003 | (300,50) | 200 × 200 | D001 |
| W003 | (500,50) | 100 × 200 | D001 |
| W005 | (900,400) | 200 × 150 | D002 |
| W006 | (1100,400) | 120 × 150 | D002 |
| W007 | (900,550) | 320 × 100 | D002 |

In Table 2, seven windows are currently opened on the PC, in which it is indicated that W003 and W004 of those windows are docked (docking information is in the line D001 of the docking table), and W005, W006 and W007 are also docked (docking information is in the line D002 of the docking table).

The "docking table" manages all the docking windows during execution. Table 3 shows the data structure. The window table has the following columns.

"Docking ID" holds the ID of docking window.

"Position" holds the upper left coordinate of each docking window.

"Size" holds the width and height of each docking window.

"Docking set" holds a set of window IDs for the windows that are docked.

TABLE 3

| Docking ID | Position | Size | Docking set |
|---|---|---|---|
| D001 | (300,50) | (300,200) | W003, W004 |
| D002 | (900,400) | (320,250) | W005, W006, W007 |

In Table 3, there are currently two docking windows during execution, in which one docking window is composed of two sub-windows and the other composed of three sub-windows.

Turning back to the window management unit, the window management unit receives an event message from the event sending unit of the window W, and performs a required operation on the necessary window by referring to the "window table" and "docking table" according to the kind of received event. The operation of each event is given below.

(Execute)

Figure 8:
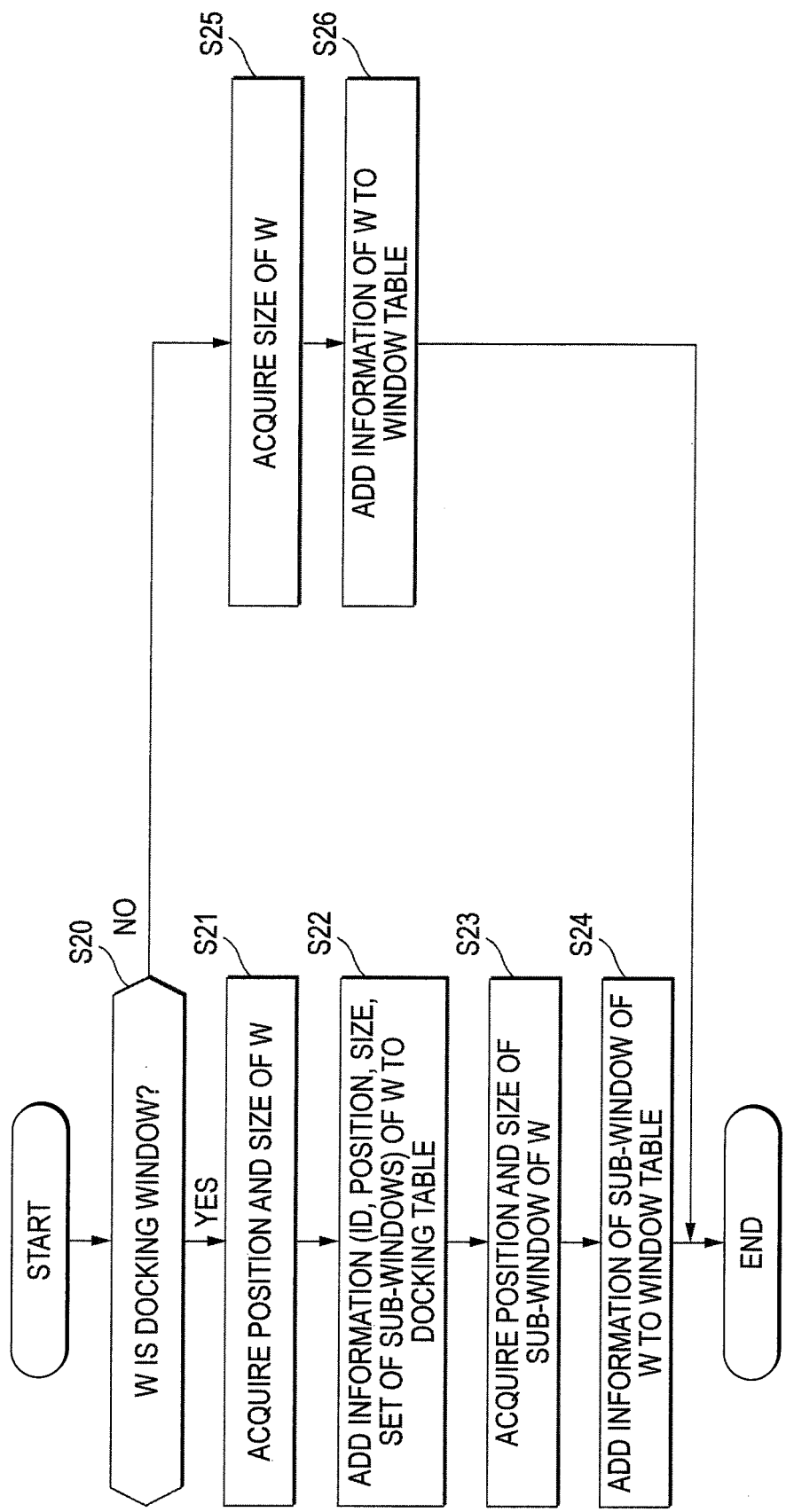
FIG. 8 is a flowchart showing the operation flow in Execute of window management unit according to this embodiment.

FIG. 8 shows an operation flow in detecting an Execute event. The operation is different depending on whether or not the W is docking window. It is checked whether or not the W is docking window (step S20). If the W is docking window, the position and size of W are acquired from the docking table (step S21), the information (ID, position, size, a set of sub-windows) of W is added to the docking table (step S22), the position and size of the sub-window are acquired from the window table (step S23), and the information of the sub-window is added to the window table (step S24). In the case where the W is non-docking window, the size of W is acquired (step S25), and the information of W is simply added to the window table (step S26).

(Move)

Figure 9:
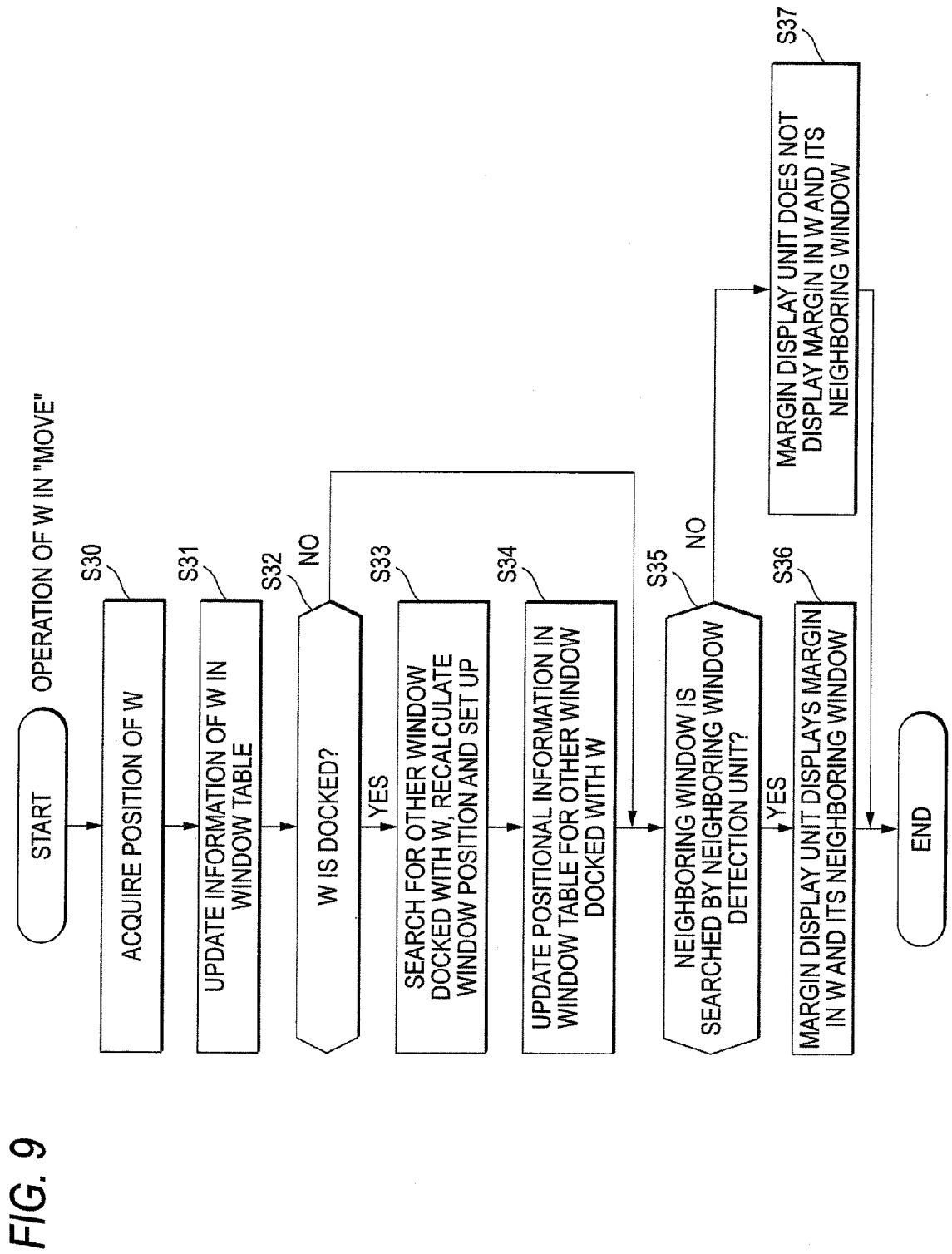
FIG. 9 is a flowchart showing the operation flow in Move of the window management unit according to this embodiment.

FIG. 9 shows an operation flow in detecting a Move event. Firstly, the position of W is acquired (step S30), and the information of W is updated in the window table (step S31). It is checked whether or not the W is docked (step S32). If the W is docked, the window position is recalculated by searching for another window docked with the W (step S33). Then, for another window docked with the W, the positional information in the window table and the corresponding information in the docking table are updated (step S34). Further, the neighboring window detection unit detects whether or not there is any neighboring window by referring to the window table (step S35). If there is the neighboring window, the margin display unit displays the margin (step S36). If there is no neighboring window, the margin display unit displays no margin (step S37).

(Drop)

Figure 10:
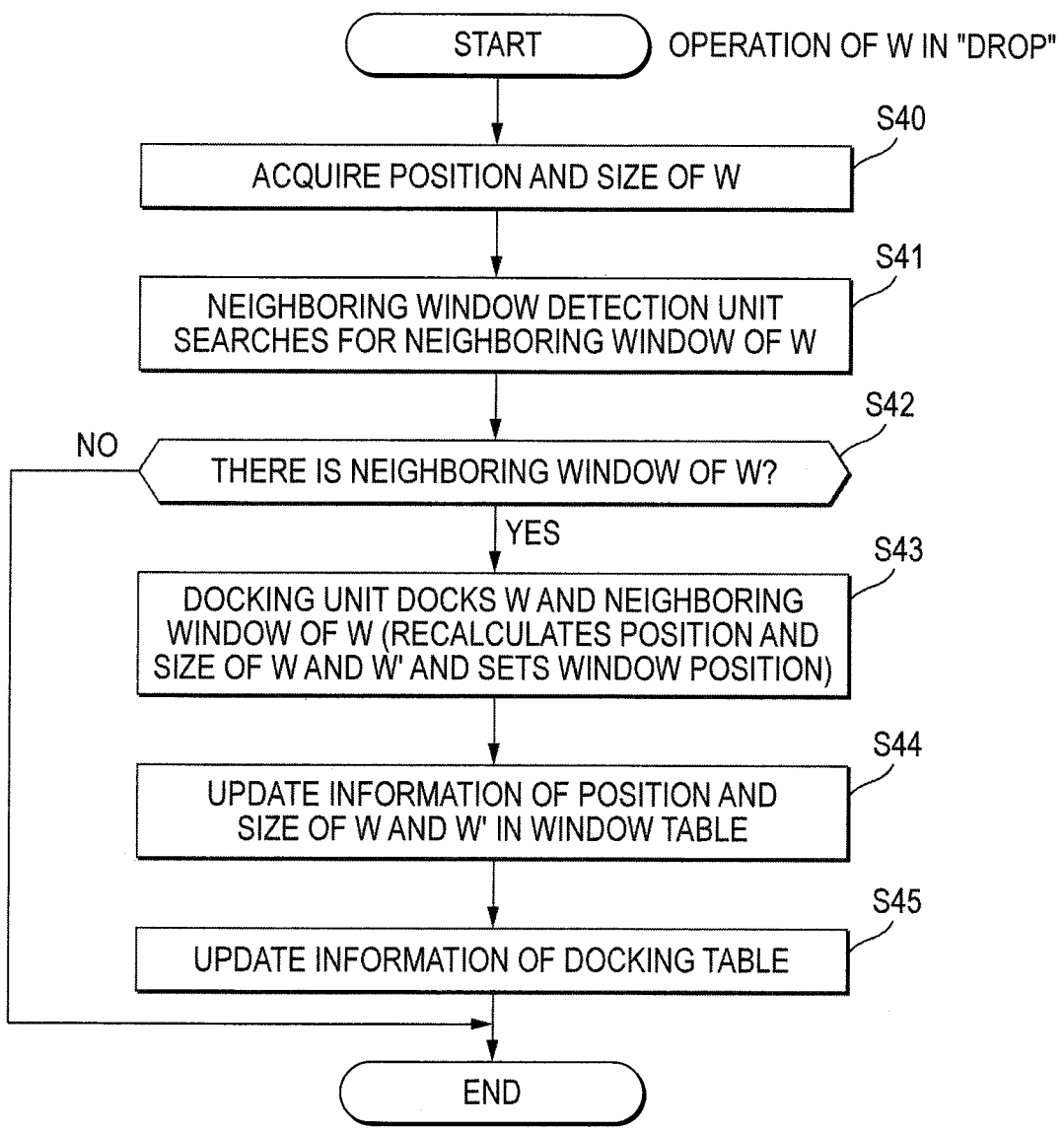
FIG. 10 is a flowchart showing the operation flow in Drop of the window management unit according to this embodiment.

FIG. 10 shows an operation flow in detecting a Drop event. Firstly, the position and size of W are acquired (step S40). Then, the neighboring window of the W is searched by the neighboring window detection unit (step S41). If there is no neighboring window, the process is ended without performing anything. If there is the neighboring window W' (step S42), the position and size of W and W' are recalculated by the docking unit, the window position is set and both are docked (step S43). Further, the information of the position and size of W and W' is updated in the window table (step S44), and the information in the docking table is also updated (step S45).

(Resize)

Figure 11:
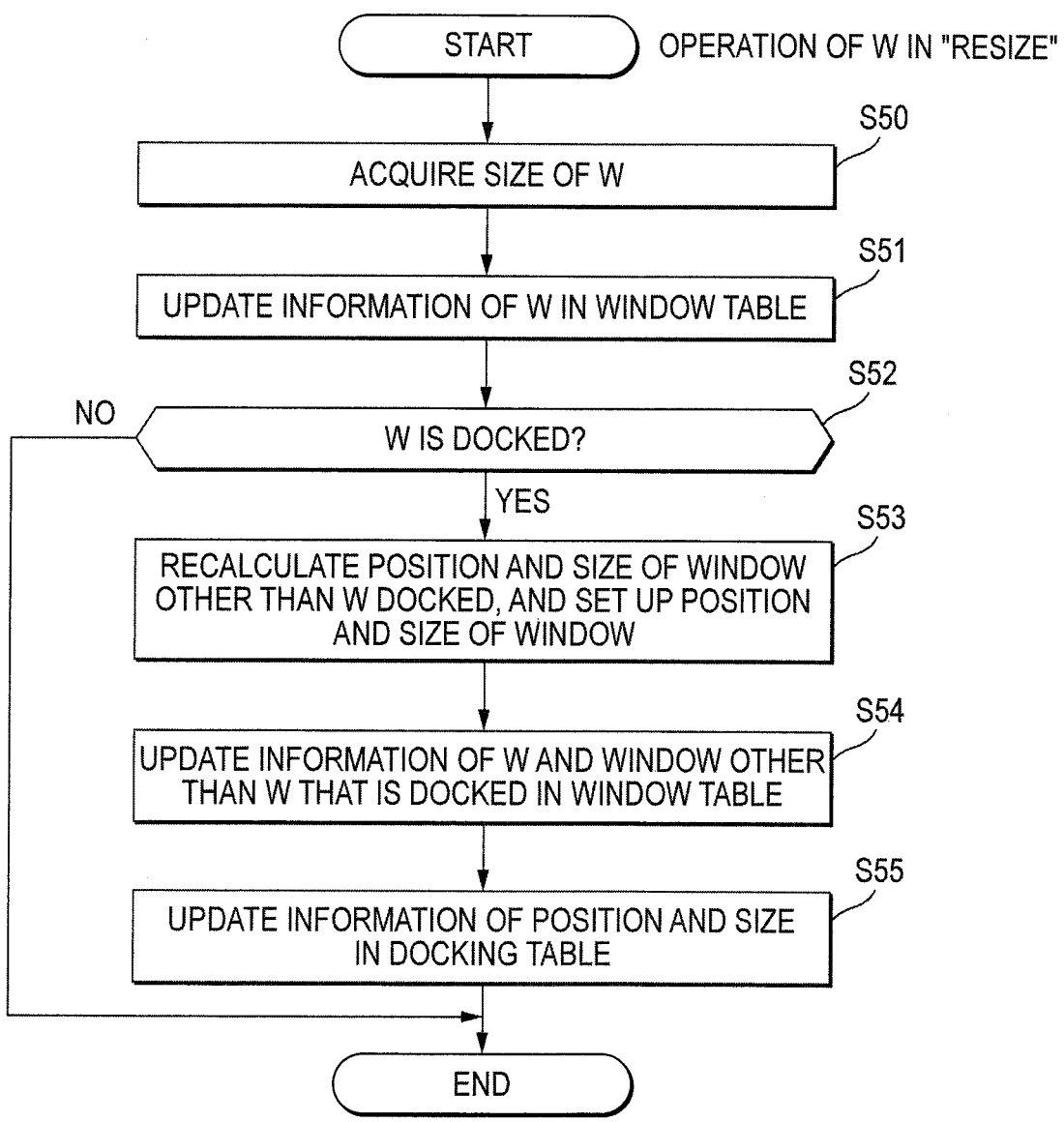
FIG. 11 is a flowchart showing the operation flow in Resize of the window management unit according to this embodiment.

FIG. 11 shows an operation flow in detecting a Resize event. Firstly, the position of W is acquired (step S50), and the information of W is updated in the window table (step S51). It is checked whether or not the W is docked with another window (step S52). If the W is not docked, the process is ended. If the W is docked with another window, the position and size of other docked window than the W are recalculated and the window position is set (step S53). Further, the information of other docked window than the W is updated in the window table (step S54), and the information of the position and size of the W is updated in the docking table (step S55).

(Neighboring Window Detection Unit)

Figure 12:
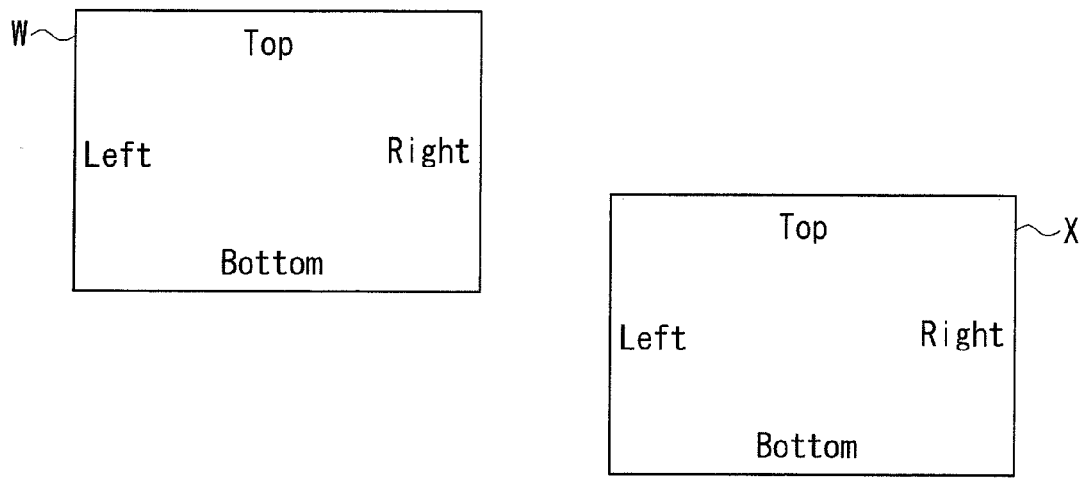
FIG. 12 is an operation explanatory view for neighboring window unit.

The operation of the "neighboring window detection unit" while the window W is moving (an event Move is detected in the W) will be described below. To represent the positions of four sides of the window, the upper side is called top (Top), the lower side is called bottom (Bottom), the left side is called left (Left), and the right side is called right (Right), as shown in FIG. 12.

Two windows can be docked if the positional relationship of windows is any of the following sets.

Right (Right)? left (Left)

Top (Top)? bottom (Bottom)

That is, there is possibility that the window W is docked with the window X in the following cases.

Right (Right) of W and left (Left) of X

Left (Left) of W and right (Right) of X

Top (Top) of W and bottom (Bottom) of X

Bottom (Bottom) of W and top (Top) of X

The window X in which the distance from the window position is less than a certain threshold is called the neighboring window of W. Herein, in looking for the neighboring window of W, firstly, the neighboring window of W is searched from the docking table. The neighboring window is returned, if any. If not, the neighboring window is searched from the window table this time. In this way, only one neighboring window is searched for the docking window or the single window that is not docked.

(Margin Display Unit)

Figure 13A:
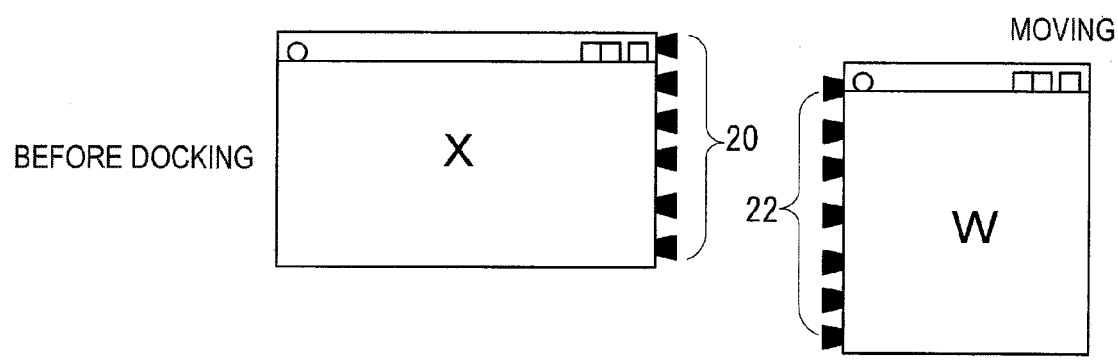

For the W being moved, if the neighboring window X is detected by the neighboring window detection unit, the margin display unit displays the margin indicating that "W and X can be docked" on both sides of W and X. If X is the neighboring window of W and the left (Left) of W and the right (Right) of W are closer, the margin display unit displays the margin 20 on the window X and the margin 22 on the window W, as shown in FIG. 13A. In a margin display mode, the shape of the side of window is changed, the color of the side of window is changed, or both the shape and color of the side of window are changed, for example. Besides, other modes are possible as far as the user can visually recognize the docking position, or the images of other colors or shapes may be added.

(Docking Unit)

If a Drop event is detected from the window W, the window management unit searches for the neighboring window of W. If the neighboring window X of W exists, the "docking unit" actually performs a docking process for W and X.

In the docking process, the operation is different depending on which side of the W is docking object (the position of this side is called the "docking position").

Figure 13B:
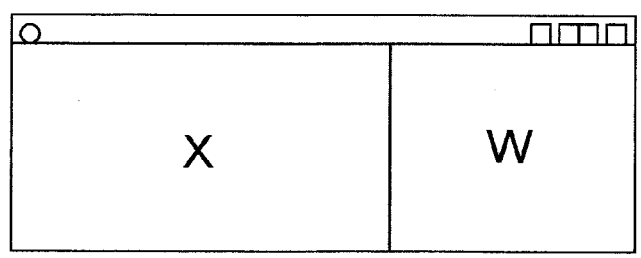

If the docking position of W is left (Left), the height of W is equalized to the height of X and the W is moved to the left of X to make contact with X (see FIG. 13B).

If the docking position of W is right (Right),
the height of W is equalized to the height of X and the W is moved to the right of X to make contact with X (see FIG. 13B).
If the docking position of W is top (Top),
the width of W is equalized to the width of X and the W is moved to the bottom of X to make contact with X.
If the docking position of W is bottom (Bottom),
the width of W is equalized to the width of X and the W is moved to the top of X to make contact with X.

2. Event Notification Method

In this embodiment, it is presupposed that the exchange of data or timing between the windows is event-driven, although the embodiment is not limited to only the event-driven. It may be performed via a memory or a file. Any way, a message is sent from each window to the manager by some unit.

Figure 14:
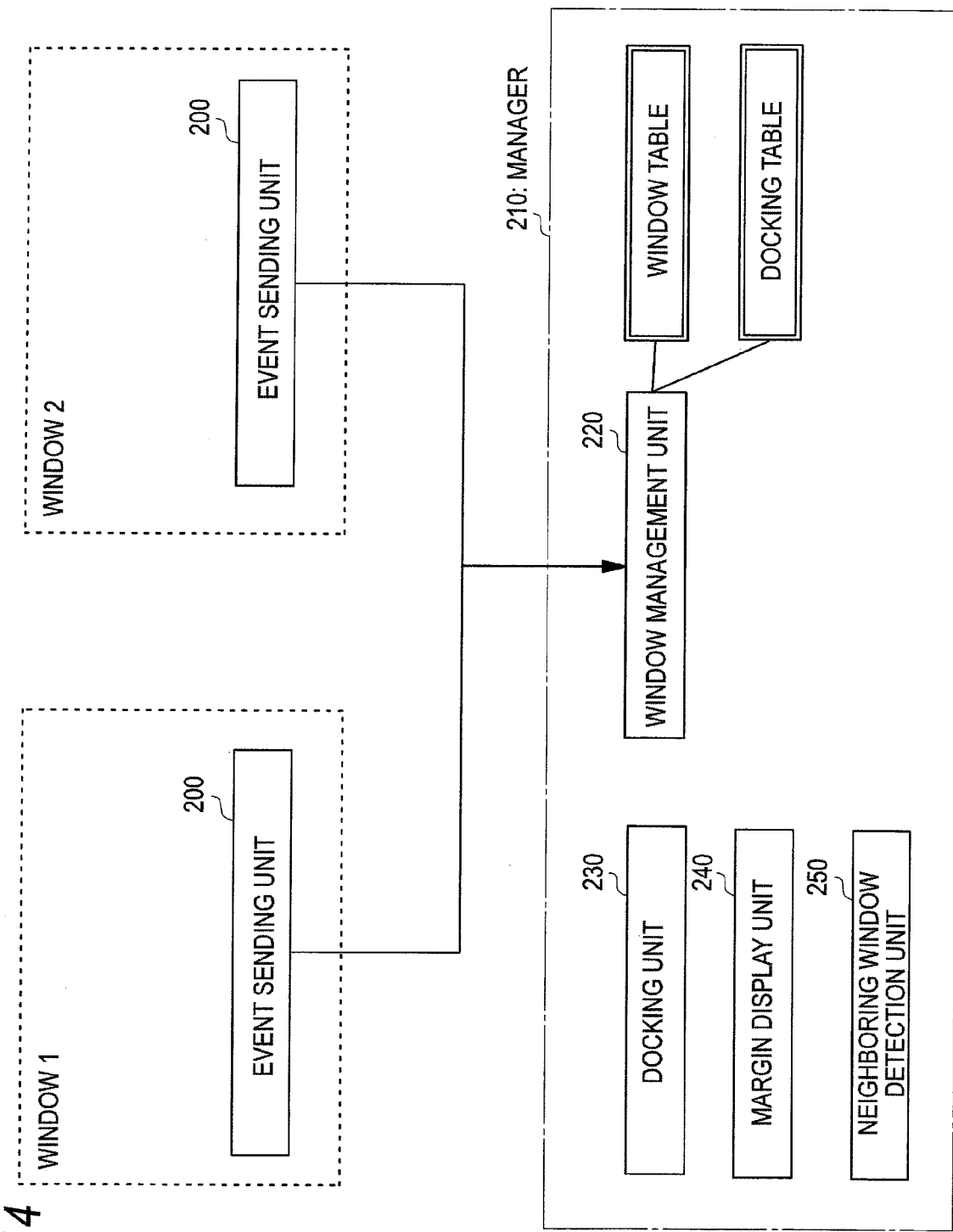
FIG. 14 is a block diagram showing the configuration of an event notification method according to this embodiment.

FIG. 14 shows a system configuration for the event notification method in this embodiment. The event notification method has event sending unit 200 for each window, as shown in FIG. 14. Further, a manager 210 for supervising the windows comprises window management unit 220, neighboring window detection unit 230, margin display unit 240 and docking unit 250.

A difference from the previous embodiment is that each window additionally has the "event sending unit" and the manager does not have the "event detection unit". Hence, the operation of the event sending unit 200 and a different point of the window management unit 220 will be described in this embodiment.

(Event Sending Unit)

The event sending unit 200 sends the event to the window management unit 220 when the following operation occurs in its own window. Though the Exit event is not detected in the previous embodiment, the Exit event is also sent from each window in this embodiment.

Table 4 shows a data structure of the event message that the event sending unit 200 sends to the window management unit 220. In Table 4, it is represented that the Move event is sent from the window having the window ID W001.

"Source window" holds the window ID of the window that sends the event.

"Kind of event" indicates the kind of event to be sent.

TABLE 4

| Source window | W0001 |
|---|---|
| Kind of event | Move |

(Window Management Unit)

The window management unit 220 is basically the same as for the event detection method. However, the management of the Exit event is newly added, and its difference will be only described below.

If any other event than Exit is received by the window management unit 220, the operation is the same as for the event detection method. The operation in receiving the Exit event will be described below.

(Exit)

Figure 15:
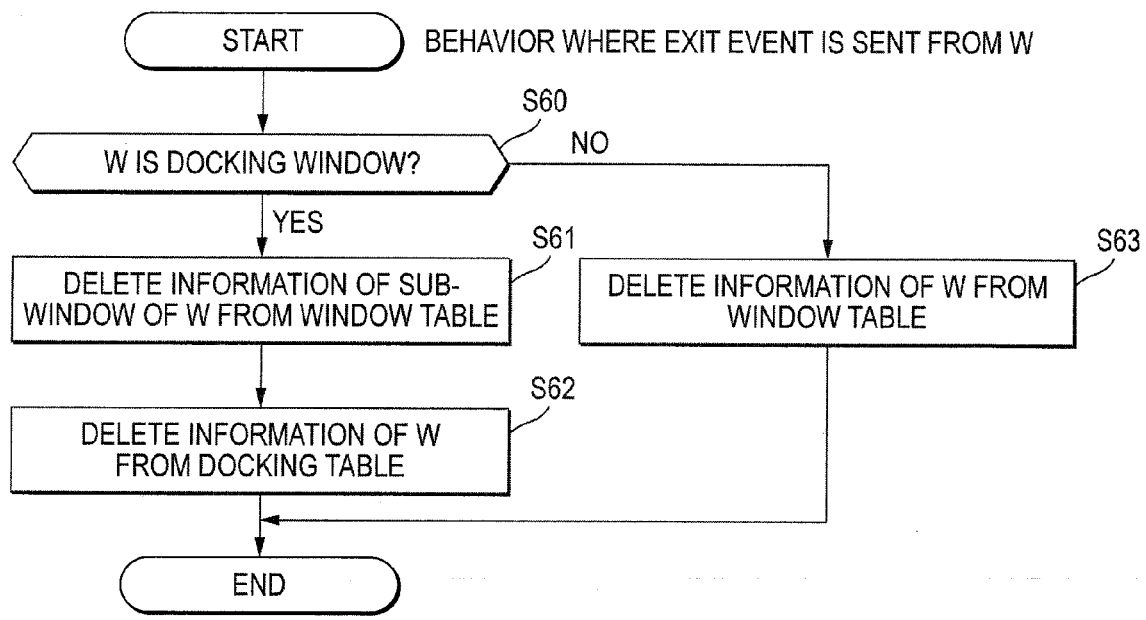
FIG. 15 is a flowchart showing the operation flow in Exit of the window management unit with the event notification method.

FIG. 15 shows an operation flow in detecting the Exit event. The operation is different depending on whether or not the W is docking window. It is checked whether or not the W is docking window (step S60). If the W is docking window, the information on the sub-window of W is deleted from the window table (step S61), and the information of W is deleted from the docking table (step S62). If the W is non-docking window, the information of W is simply deleted from the window table (step S63).

The exit event is received and the closed window is deleted from the window table and the docking table as previously described, whereby the size of the table is reduced. This leads to the more efficient process.

3. System for Saving and Regenerating the Window State/Document State

First of all, it is clearly stated that there are two saving forms in saving the state of window.

Saving the window state

In saving the window state, the following information is held.

Application of individual window
Position and size of individual window (Saving the Document State)

In saving the document state, the following information is held, in addition to the window state.

Document opened in individual window
Scroll position in individual window
Cursor position in individual window Since the configuration of saving the document state includes the configuration of saving the window state, the saving and regeneration of the document state will be described below. Also, the embodiment here will be described with the event notification system as the base.

Figure 16:
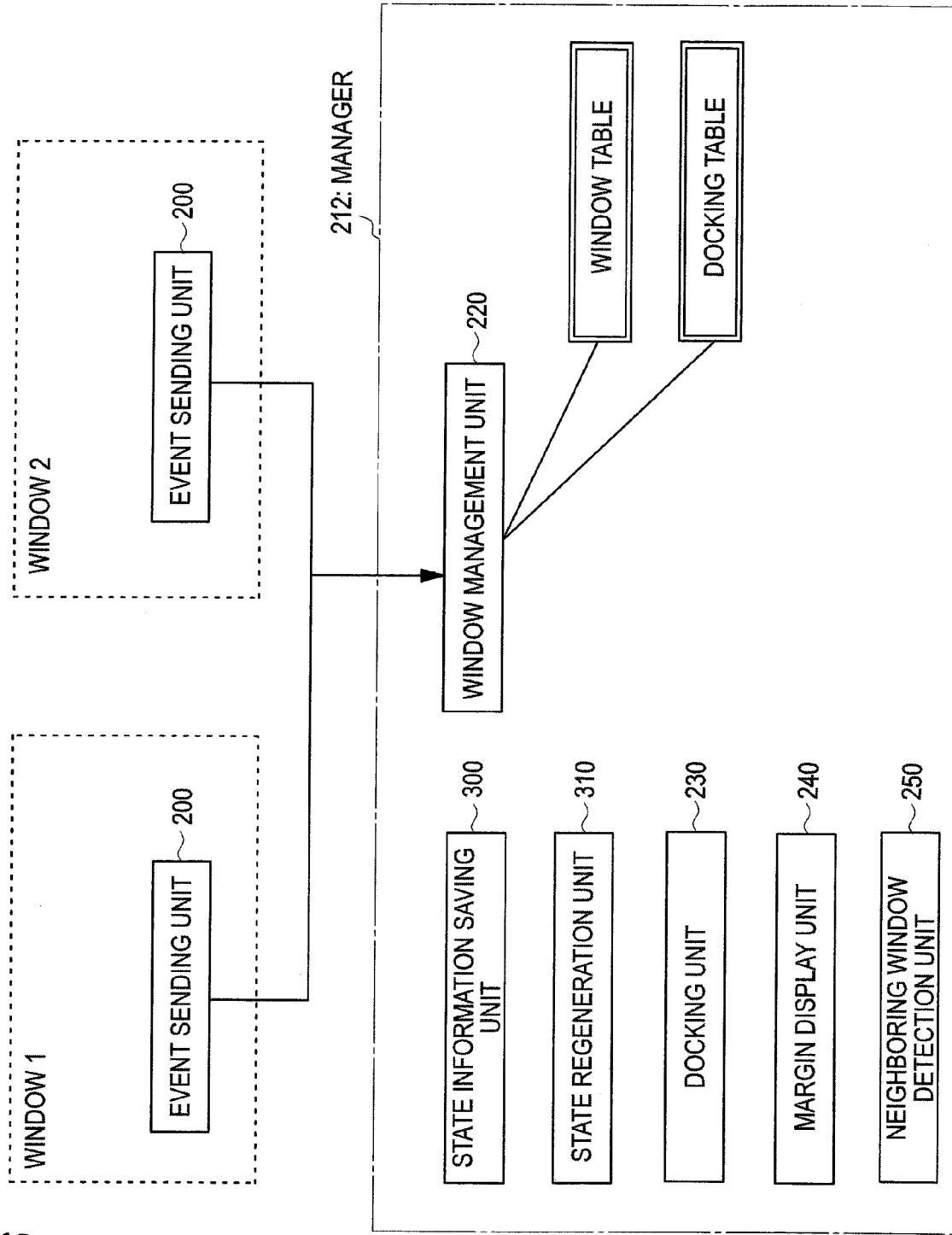
FIG. 16 is a block diagram showing a system configuration for saving and regenerating the window state/document state according to this embodiment.

FIG. 16 is a block diagram showing the configuration of a system for saving and regenerating the window state/document state. The modules of state saving unit 300 and state regeneration unit 310 are added to the side of the window manager 212 in the previous embodiment. Also, the data structure of the window table is different from the previous structure. Herein, only its difference will be described.

(Window Table)

The data structure of the window table included in the window management unit 220 is extended as shown in Table 5. Though the "window ID", "position", "size", and "docking ID" are the same as in Table 2, the following fields are extended in Table 5.

"Document" indicates the path or URL of the document opened in the window. If the document is not designated, this is blank.

"Scroll position" holds the scroll position (ratio to the length of document) of the document. If the "document" field is blank, the scroll is not made, and this field is also blank.

"Cursor position" holds the cursor position (the number of characters from the top) in the document. If the "document" field is blank, the cursor is not placed, and this field is also blank.

TABLE 5

| Window ID | Position | Size | Docking ID | Document | Scroll position | Cursor position |
|---|---|---|---|---|---|---|
| W001 | (10,10) | 120 × 200 | | | | |
| W002 | (220,40) | 300 × 200 | | | | |
| W003 | (300,50) | 200 × 200 | D001 | C:¥work¥paper.doc | 57 | 1922 |
| W003 | (500,50) | 100 × 200 | D001 | http://www.google.co.jp | | |

TABLE 5-continued

| Window ID | Position | Size | Docking ID | Document | Scroll position | Cursor position |
|---|---|---|---|---|---|---|
| W005 | (900,400) | 200 × 150 | D002 | C:¥work¥report.txt | 10 | 310 |
| W006 | (1100,40) | 120 × 150 | D002 | http://citeseer.ist.psu.edu/ | | |
| W007 | (900,550) | 320 × 100 | D002 | | | |

In the window W003 of Table 5, it is indicated that the document "C:¥work¥paper.doc" is opened, and scrolled to the position of 57% of the total, and the cursor is located at the 1922-th character from the top of the document.

(State Saving Unit)

If the saving of the docking window with the docking ID D001 is designated, the state saving unit 300 saves the structured data including information (see Table 6) in which a part regarding D001 is extracted from Table 5 in a file designated by the user or designated beforehand.

TABLE 6

| Window ID | Position | Size | Docking ID | Document | Scroll position | Cursor position |
|---|---|---|---|---|---|---|
| W003 | (300,50) | 200 × 200 | D001 | C:¥work¥paper.doc | 57 | 1922 |
| W003 | (500,50) | 100 × 200 | D001 | http://www.google.co.jp | | |

(State Regeneration Unit)

The state regeneration unit 310 reads the file and regenerates the docking window based on the above data structure. Firstly, the sub-window is opened using the designated application and the position and size of the window are decided. Further, the designated document is opened, and the scroll position and the cursor position are set up.

4. System for Presenting the Docking Object Window Candidate

Figure 17:
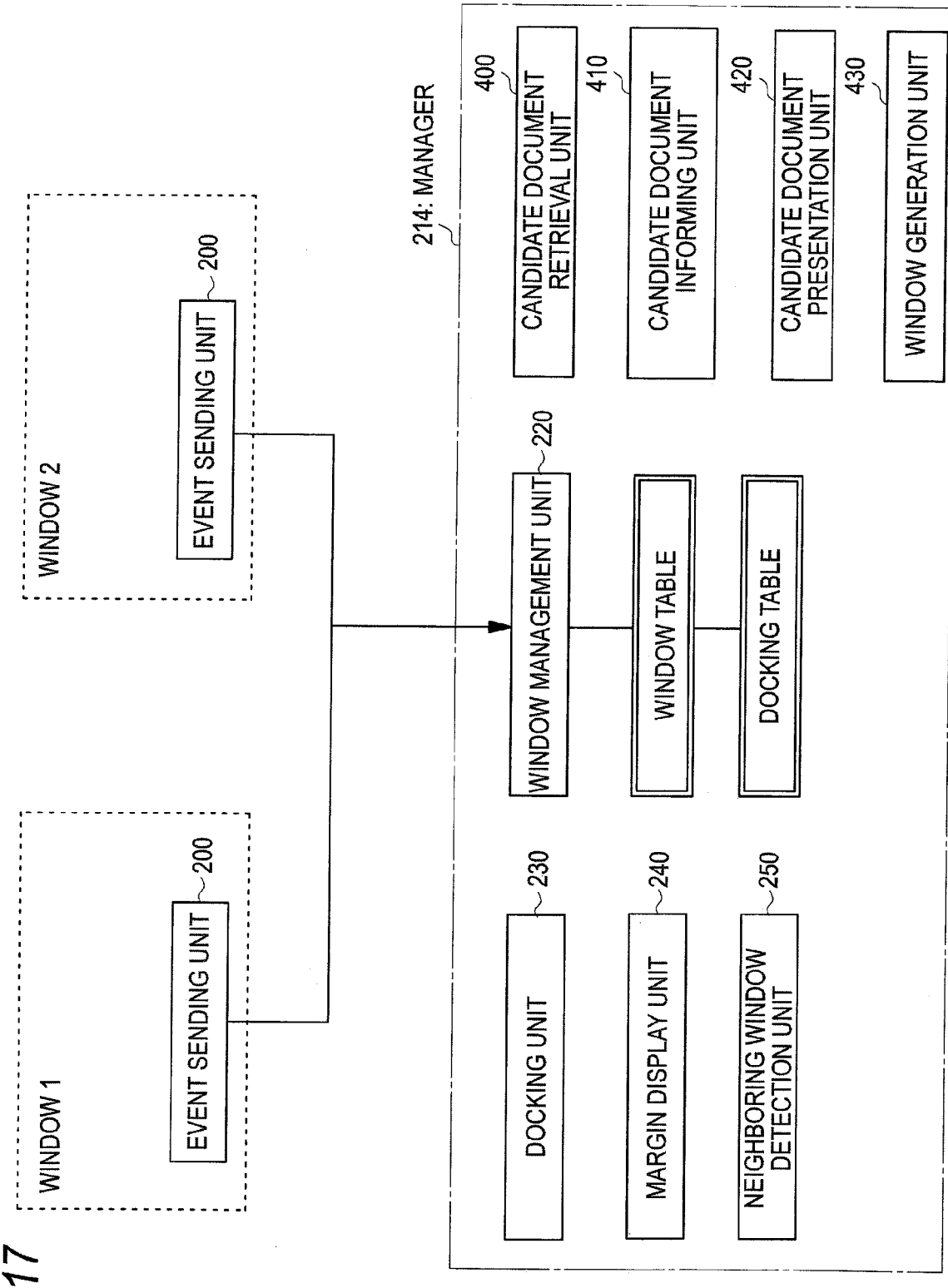
FIG. 17 is a block diagram showing a system configuration for presenting the docking object window candidate according to this embodiment.

FIG. 17 shows the system configuration for presenting the docking object window candidate. Herein, candidate document retrieval unit 400, candidate document informing unit 410, candidate document presentation unit 420 and window generation unit 430 are added on the side of the window manager 214 to the event notification system as described above.

The candidate document retrieval unit 400 automatically retrieves the document of docking object from the user's PC at the following timing.

When the user docks the window

When the retrieval of the candidate document is instructed from the user

The following retrieval methods are considered.

(a) The document in the date attribute (creation date and time, update date and time, reference date and time) closer to the document displayed in the currently active window is retrieved. If the active window is the docking window, the document in the date attribute closer to the document displayed in the sub-window is retrieved.

(b) The document that has been ever used together with the document displayed in the currently active window is retrieved. If the active window is the docking window, the document that has been ever used together with the document displayed in the sub-window is retrieved. To implement this, it is required that the use of the document so far is held as the history.

(c) The document used in another workspace (docking window) together with the document displayed in the currently active window is retrieved. If the active window is the docking window, the document used in another workspace together with the document displayed in the sub-window is retrieved. To implement this, it is required that the use of the document in the docking window is held as the history.

Herein, the window manager is a resident application that is always activated during execution of the OS. Herein, it is supposed that the window manager resides in a task tray (located to the right of the task bar, in which an icon of the resident application is displayed) of the Windows (registered trademark).

If the candidate document exists by the retrieval of the candidate document retrieval unit, the candidate document informing unit 410 changes the state of icon for the window manager in the task tray, and informs the user that the candidate document of the document exists.

Figure 18:
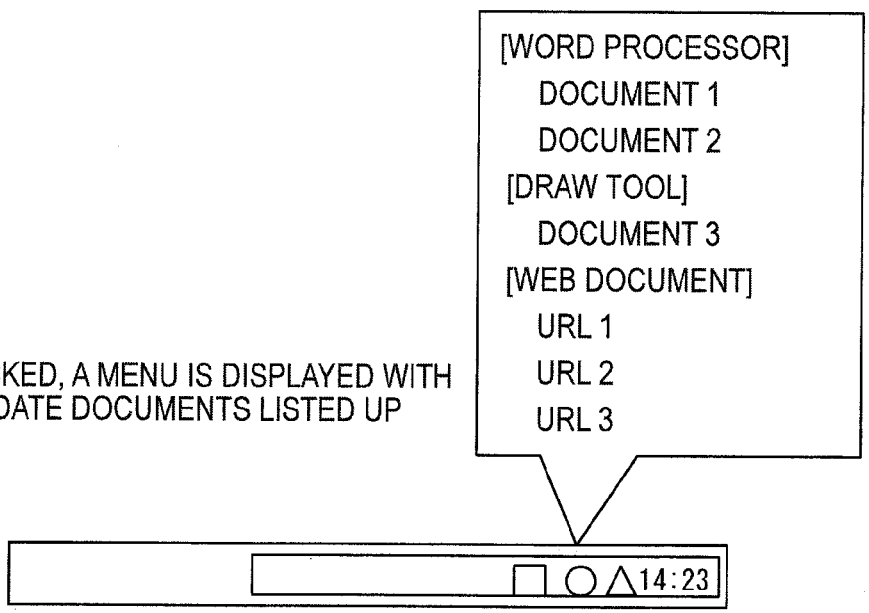
FIG. 18 is a view showing an example of listing up the candidate documents by candidate document presentation unit.

If the user clicks on the icon, seeing a change in the state of icon for the window manager, the candidate document presentation unit 420 lists up the candidate documents. This example is shown in FIG. 18. If the user clicks on the icon, a menu is displayed, and the candidate documents are listed up, and if the document is selected, the document is opened and ready for dragging, as shown in FIG. 18.

If the user selects a specific document in the listed-up menu, the window generation unit 430 opens the document with the corresponding application. And the generated window is made ready for dragging. Thereby, the user can find the document to be docked promptly, and dock it with another window immediately. This is a proposal for supporting the generation of workspace.

5. System for Recommending the Optimal Window Arrangement in the Workspace

Figure 19:
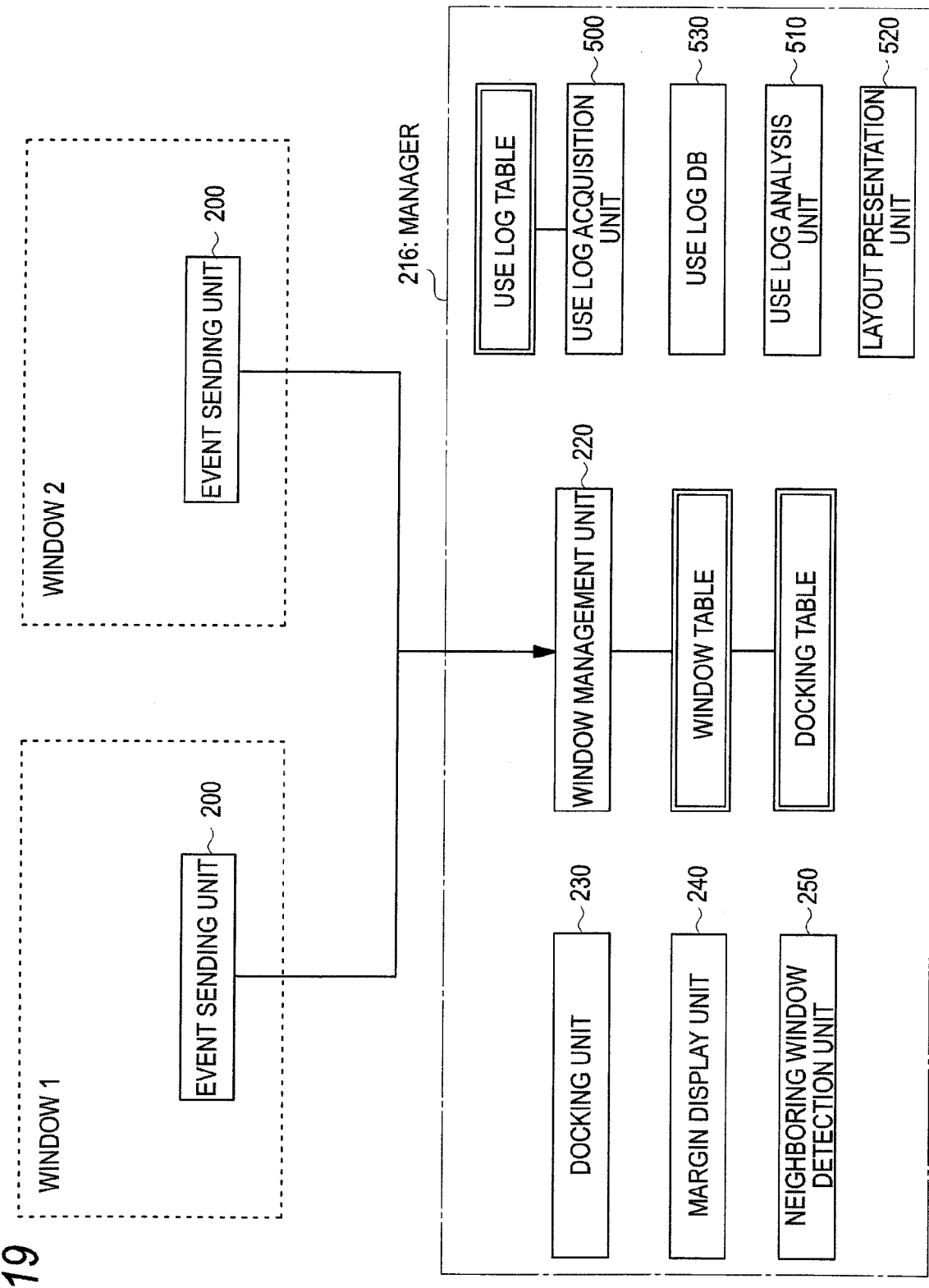
FIG. 19 is a block diagram showing a system configuration for recommending the window arrangement according to this embodiment.

FIG. 19 shows the system configuration for recommending the window arrangement. Use log acquisition unit 500, use log analysis unit 510, and layout recommendation unit 520 are added on the side of the window manager 216 to the embodiment of the event notification system.

(Use Log Acquisition Unit)

The use log acquisition unit 500 acquires the log for the operation on the sub-window within the docking window and stores the history in a use log table. The use log table is the table holding the operation history for the docking window. Table 7 shows one example of the data structure. This table has the following fields.

"Date and time" holds the date and time when the operation occurs.

"Docking ID" holds the ID of the docking window in which the operation is performed. Herein, the docking ID is not different for every activation of the docking window.

"Window ID" holds the window ID of the sub-window in the docking window. Herein, the window ID is not different for every activation.

"Kind of operation" holds what operation is made from the user. Though the operation such as active, scroll, click or input is held for the time being, active is the most important among them. In the following algorithm for the use log analysis unit, the history of active is analyzed to make the recommendation.

TABLE 7

| Date and time | Docking ID | Window ID | Kind of operation |
|---|---|---|---|
| 2006 Sep. 20 15:22:14 214 | D001 | W003 | Active |
| 2006 Sep. 20 15:22:15 412 | D001 | W003 | Scroll |
| 2006 Sep. 20 15:22:20 888 | D001 | W003 | Click |
| 2006 Sep. 20 15:22:23 377 | D001 | W003 | Input |
| 2006 Sep. 20 15:25:32 532 | D001 | W005 | Active |
| 2006 Sep. 20 15:25:35 114 | D001 | W004 | Active |
| 2006 Sep. 20 15:25:35 114 | D002 | W032 | Active |

The use log analysis unit 510 analyzes a use log DB 530, and searches for the optimal arrangement of sub-windows in the docking window.

Figure 20:
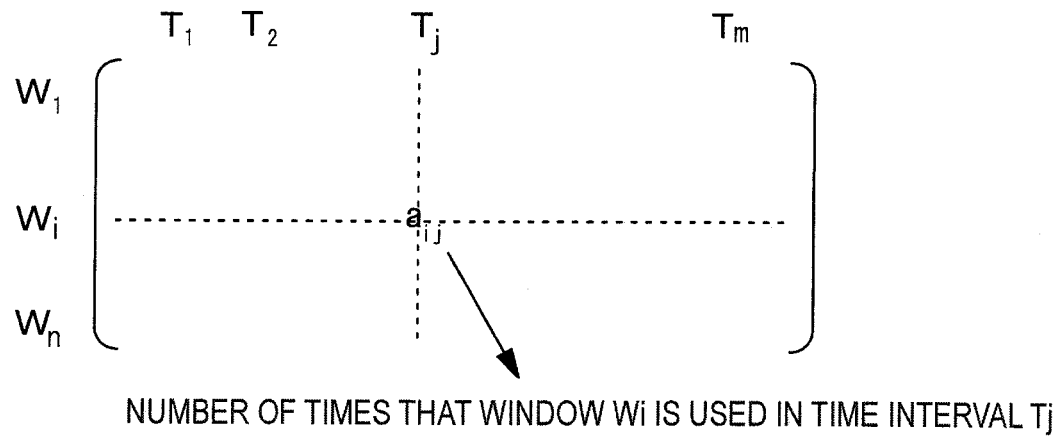
FIG. 20 is a view for explaining the concept of calculating the degree of similarity between the sub-windows according to this embodiment.

Herein, as one example, a system for recommending the optimal arrangement of sub-windows in the docking window D is given. Firstly, two indexes are introduced.
(a) Use frequency of sub-window
(b) Degree of similarity between sub-windows The degree of similarity between the sub-windows is calculated as the height of possibility that the different sub-windows are used at the same time (within a relatively short time). The time section is partitioned at every fixed time interval T. And a matrix is created in which the sub-window is in the row and the time partitioned by the length T is in the column, with the number of times that the sub-window becomes active within the time as the element. The degree of similarity between the sub-windows A and B is defined as the cosine of the row vectors corresponding to A and B. As a result, the degree of similarity between the windows having more number of times that they are used together within the fixed time interval is higher. FIG. 20 shows conceptually the relationship between the matrix and the degree of similarity.

First of all, it is considered that there is the effect only by presenting the indexes (i.e., use frequency of sub-window and the degree of similarity between the sub-windows) at this stage to the user. This is because the user may possibly notice, in the workspace of his or her own, such a problem that the sub-window with high use frequency is located in a hard-to-use place or two sub-windows having higher frequency of being used together are arranged apart.

Next, a system for recommending the arrangement of sub-windows in the workspace using the above two indexes will be described below. In reality, this algorithm is complex because it is required to take into consideration the size of window. Herein, a very simple method is introduced.
(1) The sub-window with the highest use frequency is placed to the leftmost.
(2) The window with higher degree of similarity with it is placed at the second from the left.
(3) The window with the higher degree of similarity to the second sub-window from the left among the sub-windows of which the arrangement is not yet decided is placed at the third from the left.
(4) The arrangement of all the sub-windows (in the order from the left) is decided by repeating the step of (3).
(5) The size of sub-window is decided in breadth to be proportional to the original area of the sub-window.

By deciding the arrangement in the above stance, the windows having the possibility that they are used together are arranged adjacently. Though the original shape of sub-window is changed, the ratio of areas is held.

The layout presentation unit 520 presents a sample of layout to the user. The user changes the layout of sub-window in the workspace by oneself while seeing the sample.

It is possible to make not only the recommendation for the arrangement of sub-windows but also the recommendation for excluding the sub-window scarcely used from the workspace or reducing the size.

6. Embedded Docking

As described above, the embedded docking has the following features in the operation. The total size of window (on the dropped side) is not changed before and after docking. The "margin" is displayed on plural sides of the window.

Herein, a realization method for the embedded docking in an extended form of the embodiment of the event notification unit will be described below. FIG. 21 shows a system configuration for embedded docking.

Neighboring sub-window detection unit 600 is added on the side of the manager 218 to the system configuration diagram for the event notification method. Further, the operation of the neighboring window detection unit 600, the margin display unit 240, and the docking unit 230 is different from the event notification method. These will be described below.
(Neighboring Window Detection Unit)

The neighboring window detection unit 600 of the event notification method also detects two overlapping windows in this embodiment, besides the two windows only in the relationship of left (Left) and right (Right) or top (Top) and bottom (Bottom).

A distinction between the extended docking and the embedded docking is that the extended docking is made if the windows do not overlap as shown in FIG. 22A, and the embedded docking is made if the windows overlap as shown in FIG. 22B. In FIG. 22, the heavy line 30 drawing the outer shape of window represents the margin. In the extended docking where two windows do not overlap, the neighboring sub-window detection unit is not required, but the process may be performed in the same way as before.
(Neighboring Sub-Window Detection Unit)

The neighboring sub-window detection unit 600 decides the sub-window in the docking window to be pushed aside and the position to dock the window anew, if the neighboring window detection unit judges the embedded docking. Conceptually, this operation is performed as shown in FIG. 23.

The neighboring sub-window detection unit 600 has the following two steps.
(1) Detecting the sub-window to be pushed aside.
(2) Detecting the pushing aside position in the sub-window to be pushed aside.

Herein, an instance of embedded docking the new window C somewhere in the docking window AB into which two windows A and B are docked is given as shown in FIG. 23.

At step 1, the sub-window to be pushed aside is detected. The center of gravity of A (center of rectangle of window) and the center of gravity of B are calculated. The distances from them to the center of gravity of C are calculated, and the window with closer distance is the window to be docked with the window C. Herein, it is supposed that B is the docking object.

Figure 23C:
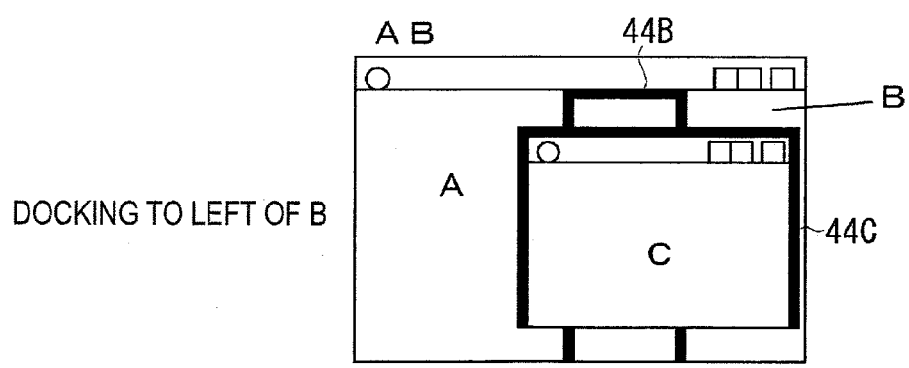
Figure 24:
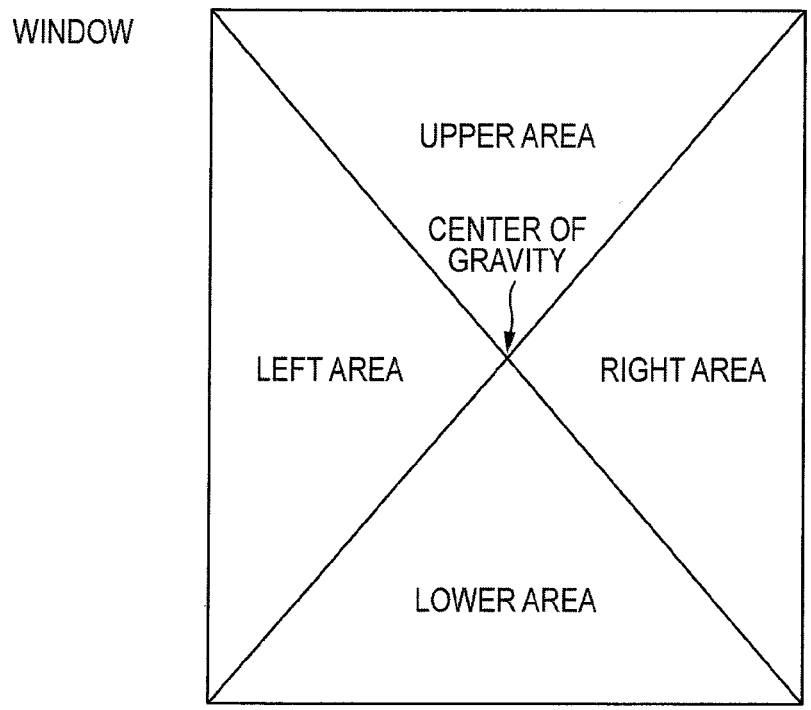
FIG. 24 is a view for explaining an example of dividing an area within the window.

At step 2, which position in the window B to be pushed aside is decided. Firstly, a window area of B is divided into four sub-areas partitioned by two diagonal lines, as shown in FIG. 24. Then, the distances from each center of gravity of four sub-areas of B to the center of gravity of C are calculated. The sub-area with the closest distance is the embedding position of C into B. For example, if the center of gravity of C is closer to the center of gravity of the left sub-area of B (example of FIG. 23C), C is embedded into the right position of B, and docked.

(Margin Display Unit)

Figure 23A:
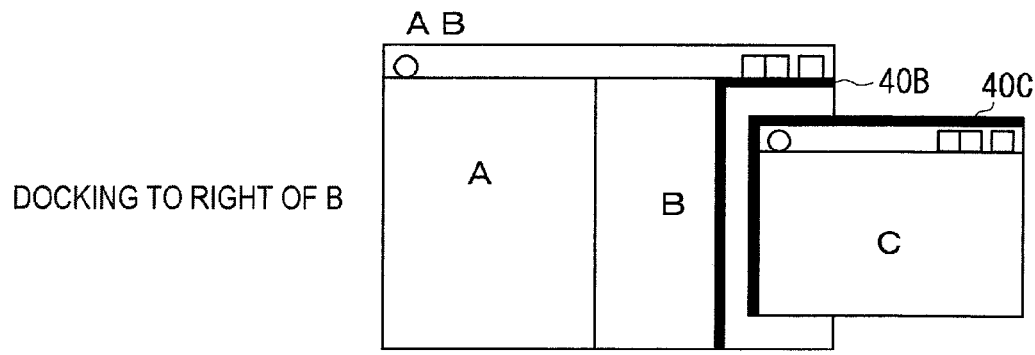
FIGS. 23A to 23C are views for explaining the operation of neighboring sub-window detection unit.
Figure 23B:
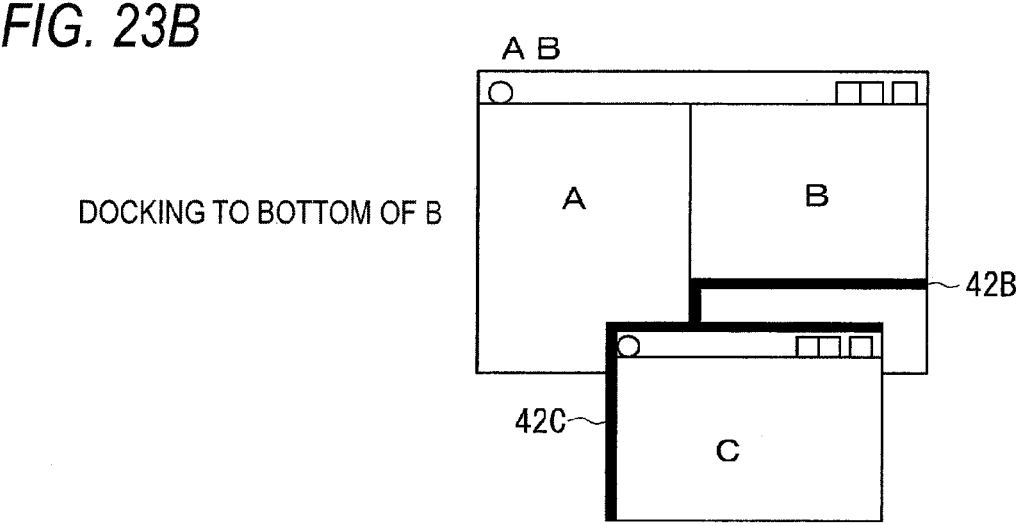

The margin display unit 240 displays the margin at the embedding position (to the left in the previous example) of the sub-window (B in the previous example) detected by the neighboring sub-window detection unit 600 and the corresponding position of the window (C in the previous example) being dragged. Herein, the corresponding position unit the sides 40B, 40C, 42B, 42C, 44B and 44C to contact other sub-windows as a result of docking, as shown in FIGS. 23A, 23B and 23C.

(Docking Unit)

The docking unit 230 docks the new window (C in the previous example) in the part of margin displayed by the margin display unit 240.

Figure 25:
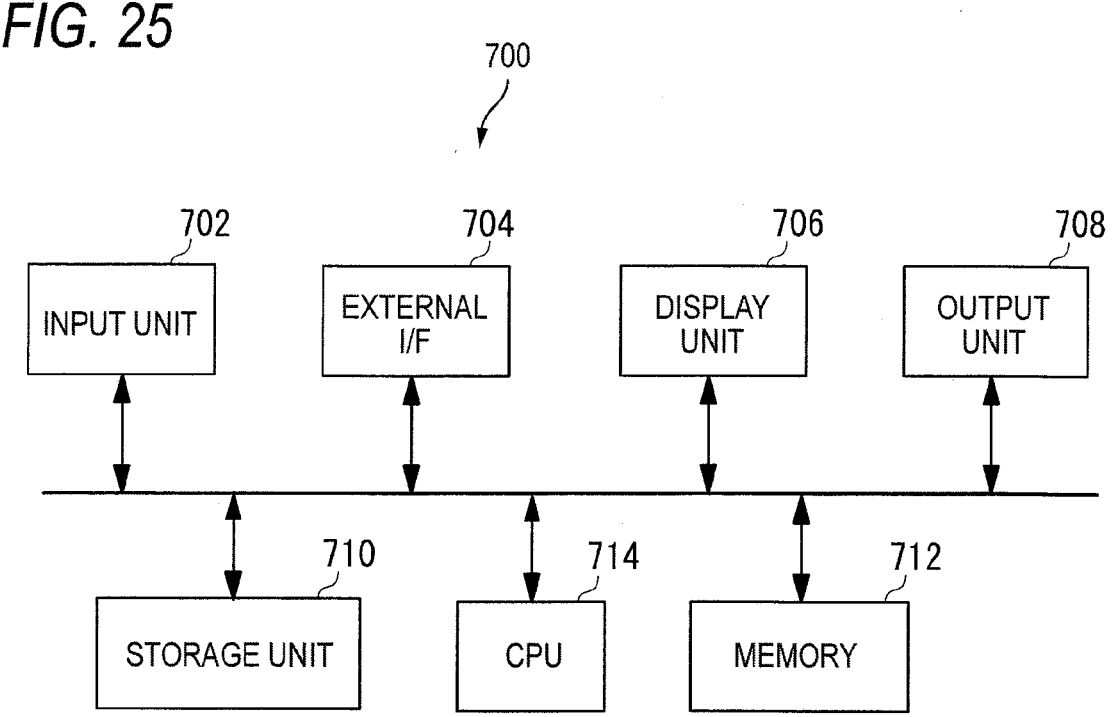
FIG. 25 is a diagram showing a configuration example of a processing apparatus for performing the workspace management system, a workspace management method, and a workspace management program according to this embodiment.

FIG. 25 is a diagram showing one example of a processing apparatus for performing the workspace management method according to this embodiment. The processing apparatus 700 according to this embodiment comprises an input unit 702 including a keyboard, a mouse, a touch panel, an image scanner, and other inputs, an external interface (I/F) 704 that enables the transmission and reception of information to and from an external network, a display unit 706, an output unit 708 such as a printer, a storage unit 710 that can store various kinds of data, a memory 712 for storing an OS, a program and the application software, and a CPU (Central Processing Unit) 714 that can control the operation of each part in accordance with the program.

The CPU 714 executes an application stored in the memory 712 to display a window for user interface on the display unit 706 to provide the user with the workspace. The workspace management system of this embodiment is incorporated into the OS and/or application software to enable the docking of the windows as described above. The window displayed on the display unit 706 is manipulated via the input unit 702 such as the mouse by the user.

Though the preferred embodiments of the invention have been detailed above, the invention is not limited to those specific embodiments, but various variations and modifications may be made without departing from the spirit or scope of the invention as defined in the claims.

The foregoing description of the embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention defined by the following claims and their equivalents.

What is claimed is:

1. A workspace management method for managing a first window and a second window displayed in response to start-up of an application as a workspace for user interface, the method comprising:
    managing management information regarding the first window and the second window;
    detecting a change in a state of the first window;
    displaying, in response to detecting the change in state, a first docking position on the first window at which the first window is to be connected to the second window, the first docking position displayed on a specific side of the first window visually distinguishable from sides of the first window other than the specific side of the first window;
    determining, in response to displaying the first docking position, the second window is a neighboring window positioned in the neighborhood of the first window or overlapping the first window by referring to the management information;
    displaying, in response to determining the second window as the neighboring window, a modified first docking position on the first window at which the first window is to be connected to the second window visually distinguishable from the first docking position and a second docking position on the second window at which the second window is to be connected to the first window; and
    docking the first window with the second window at the modified first docking position and the second docking position, in response to displaying the modified first docking position and second docking position.

2. The workspace management method as claimed in claim 1, wherein the first window is started by a first application and the second window is started by a second application.

3. The workspace management method as claimed in claim 1, wherein the first window and the second window are rectangular, the first window is docked in a size adapted to a size of one side of the second window, and the first window is a first sub-window of a docked window and the second window is a second sub-window of the docked window.

4. The workspace management method as claimed in claim 1, wherein the displaying the first modified docking position and the second docking position comprises displaying the first modified docking position on at least two sides of the first window and displaying the second docking position on at least two sides of the second window.

5. The workspace management method as claimed in claim 3, further comprising:
    changing, in response an input to change a size of the first sub-window, a size of the second sub-window by referring to the management information.

6. The workspace management method as claimed in claim 3, further comprising:
    moving, in response to an input for movement of the docked window, the docked window as a whole.

7. The workspace management method as claimed in claim 3, further comprising:
    canceling the docking of the first window and the second window.

8. The workspace management method as claimed in claim 1, wherein the first modified docking position faces the second docking position.

9. A workspace management system for managing a first window and a second window displayed in response to start-up of an application as a workspace for user interface, the system comprising:
    a processor functioning as:
    a window management unit that stores management information regarding the first window and the second window;
    a detection unit that detects a change in a state of the first window;

a presentation unit that displays, in response to the detecting unit detecting the change in state of the first window, a docking position on the first window at which the first window is to be connected to the second window, the docking position displayed on a specific side of the first window visually distinguishable from sides of the first window other than the specific side of the first window;

a window detection unit that detects, in response to the presentation unit displaying the docking position, the second window is a neighboring window positioned in the neighborhood of the first window or overlapping the first window by referring to the management information, wherein the presentation unit displays a modified docking position on the first window at which the first window and the second window are to be docked visually distinguishable from the docking position; and a docking unit that docks the first window with the second window at the modified docking position, in response to the presentation unit displaying the modified docking position.

10. The workspace management system as claimed in claim 9, wherein the presentation unit comprises a display unit.

11. The workspace management system as claimed in claim 9, wherein the detection unit periodically monitors a state of the first window to detect change in the state of the first window.

12. The workspace management system as claimed in claim 9, wherein the detection unit detects a type of change in a state of the first window.

13. The workspace management system as claimed in claim 9, wherein the first window is started by a first application and the second window is started by a second application.

14. The workspace management system as claimed in claim 9, wherein the management information comprises identification information that identifies the first window and the second window, positional information that indicates positions of the first window and the second window, and size information that indicates sizes of the first window and the second window.

15. The workspace management system as claimed in claim 9, wherein the first window and the second window are rectangular, the first window is docked in a size adapted to a side of the second window, and the first window is a first sub-window of a docked window second window is a second sub-window of the docked window.

16. The workspace management system as claimed in claim 10, wherein the presentation unit displays the modified docking position on at least two sides of the first window.

17. The workspace management system as claimed in claim 15, further comprising:
a size change unit that changes, in response to an input to change a size of the first sub-window, a size of the second sub-window by referring to the management information.

18. The workspace management system as claimed in claim 15, further comprising:
a movement unit that moves, in response to an input for movement of the docked window, the docked window as a whole.

19. The workspace management system as claimed in claim 15, further comprising:
a state saving unit that saves a state of the docked window; and
a state regeneration unit that regenerates the docked window based on the state saved by the state saving unit.

20. The workspace management system as claimed in claim 9, wherein the docking unit docks together the first window with the second window as a docked window that includes the first window as a first sub-window and the second window as a second sub-window, and
wherein the processor further functions as:
a use history holding unit that stores first operation history information of the first sub-window that indicates a first frequency of use of the first sub-window and second operation history information of the second sub-window that indicates a second frequency of use of the second sub-window; and
an arrangement recommendation unit that determines an arrangement of the first sub-window and the second sub-window in the docked window based on the first frequency of use of the first operation history information and the second frequency of use of the second operation history information.

21. The workspace management system as claimed in claim 20, wherein the arrangement recommendation unit calculates the first frequency of use, the second frequency of use, and a degree of similarity between the first sub-window and the second sub-window based on the first frequency of use and the second frequency of use, and determines the arrangement based on the determined degree of similarity.

22. A non-transitory computer readable medium storing a program causing a computer to execute a process for managing a first window and a second window displayed in response to start-up of an application as a workspace for user interface, the process comprising:
storing management information regarding the first window and the second window;
detecting a change in a state of the first window;
displaying, in response to detecting the change in state, a first docking position on the first window at which the first window is to be connected to the second window, the first docking position displayed on a specific side of the first window visually distinguishable from sides of the first window other than the specific side of the first window;
detecting, in response displaying the first docking position, the second window is a neighboring window positioned in the neighborhood of the first window or overlapping the first window by referring to the management information;
displaying, in response to determining the second window as the neighboring window, a first modified docking position on the first window at which the first window is to be connected to the second window visually distinguishable from the first docking position and a second docking position on the second window at which the second window is to be connected to the first window; and
docking the first window with the second window at the modified first docking position and the second docking position, in response to displaying the modified first docking position and second docking position.

23. The computer readable medium as claimed in claim 22, wherein the first window and the second window are rectangular, the first window is docked in a size adapted to a size of one side of the second window, and the first window is a first sub-window of a docked window and the window is a second sub-window of the docked window.

24. The computer readable medium as claimed in claim 22, further comprising:
a movement unit that moves the docked window.

25. The computer readable medium as claimed in claim 22, further comprising:
- a state saving unit that saves a state of the docked window; and
- a state regeneration unit that regenerates the docked window based on the state saved by the state saving unit.

26. A non-transitory computer readable medium storing a program causing a computer to execute a process for managing a first window and a second window displayed in response to start-up of an application as a workspace for user interface, the process comprising:
- displaying a docking position on the first window at which the first window is to be connected to the second window, the docking position displayed on a specific side of the first window visually distinguishable from sides of the first window other than the specific side of the first window;
- detecting that first window is dragged to be closer to the second window;
- displaying a modified docking position on the first window at which the first window and the second window are to be docked visually distinguishable from the docking position, in response to the detecting; and
- docking the first window with the second window at the modified docking position to generate a docking window, in response to displaying the modified docking position.

27. The computer readable medium as claimed in claim 26, wherein the displaying the modified docking position comprises displaying a specific side of the first window to be distinguishable from sides of the first window other than the specific side.

28. The computer readable medium as claimed in claim 26, wherein the detecting comprises periodically monitoring a state of the first window to detect a change in the state of the first window.

29. The computer readable medium as claimed in claim 26, wherein the detecting comprises detecting a type of change in a state of the first window.

30. The computer readable medium as claimed in claim 26, wherein the first window is started by a first application and the second window is started by a second application.

* * * * *